(12) United States Patent
Choi et al.

(10) Patent No.: US 9,360,976 B2
(45) Date of Patent: Jun. 7, 2016

(54) TOUCH PANEL AND DISPLAY DEVICE INCLUDING THE SAME

(71) Applicant: Samsung Display Co. Ltd., Yongin, Gyeonggi-Do (KR)

(72) Inventors: Chung-Sock Choi, Seoul (KR); Jin Koo Kang, Cheonan-si (KR); Soo Youn Kim, Siheung-si (KR); Seung Hun Kim, Hwaseong-si (KR); Hyun Ho Kim, Hwaseong-si (KR); Seung Yong Song, Suwon-si (KR); Cheol Jang, Uiwang-si (KR); Sang Hwan Cho, Suwon-si (KR); Sang Hyun Park, Hwaseong-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 76 days.

(21) Appl. No.: 14/229,433

(22) Filed: Mar. 28, 2014

(65) Prior Publication Data

US 2015/0130745 A1    May 14, 2015

(30) Foreign Application Priority Data

Nov. 11, 2013    (KR) .................. 10-2013-0136348

(51) Int. Cl.
*G06F 3/044*    (2006.01)

(52) U.S. Cl.
CPC ...... *G06F 3/044* (2013.01); *G06F 2203/04111* (2013.01)

(58) Field of Classification Search
CPC combination set(s) only.
See application file for complete search history.

(56) References Cited

U.S. PATENT DOCUMENTS

| 2010/0007621 A1* | 1/2010 | Kang | ............... G06F 3/044 345/173 |
| 2010/0052521 A1* | 3/2010 | Kim | ............... G06F 3/0412 313/504 |
| 2014/0117330 A1 | 5/2014 | Cho et al. | |
| 2014/0118360 A1* | 5/2014 | Ma | ............... G02B 5/22 345/501 |

FOREIGN PATENT DOCUMENTS

| KR | 10-2002-0088488 A | 11/2002 |
| KR | 10-2011-0049476 A | 5/2011 |
| KR | 10-2011-0137129 A | 12/2011 |
| KR | 10-2012-0047054 A | 5/2012 |
| KR | 10-2013-0044058 A | 5/2013 |
| KR | 10-2014-0056498 A | 5/2014 |

\* cited by examiner

*Primary Examiner* — Gerald Johnson
*Assistant Examiner* — Robert Michaud
(74) *Attorney, Agent, or Firm* — Knobbe, Martens, Olson & Bear, LLP

(57) ABSTRACT

A touch panel and a display device including the same are disclosed. In one aspect, the touch panel includes a destructive interference (DI) unit including a plurality of dielectric layers and a plurality of metal layers that are alternately stacked and a transparent conductive layer formed over the DI unit. The transparent conductive layer includes a plurality of first sensing patterns and one of the metal layers includes a plurality of second sensing patterns and a plurality of non-sensing metal patterns adjacent to and alternately arranged with the second sensing patterns.

20 Claims, 14 Drawing Sheets

TOUCH PANEL AND DISPLAY DEVICE INCLUDING THE SAME

CROSS-REFERENCE TO RELATED APPLICATIONS

This application claims priority from Korean Patent Application No. 10-2013-0136348 filed on Nov. 11, 2013 in the Korean Intellectual Property Office, the disclosure of which is incorporated herein by reference in its entirety.

BACKGROUND

1. Field

The described technology generally relates to a touch panel and a display device including the same.

2. Description of the Related Technology

Touch panels are a type of input device which enable users to select objects displayed on the screen of a display panel with a hand or other object in order to enter input. The range of applications for touch panels has steadily increased because touch panels can replace other input devices such as keyboards or mice.

In general, touch panels are attached onto display panels to form display devices. To improve the portability of such devices, various efforts have been made to fabricate thinner, lighter-weight touch panels.

When used in an outdoor environment touch panel display devices may suffer from various problems associated with contrast and visibility due to the reflection of ambient light. The standard method of reducing the reflection of ambient light includes attaching a circularly polarizing plate to one side of an organic light-emitting diode (OLED) display device.

However, circularly polarizing plates include a plurality of films such as a linear polarizing film, a ¼ wavelength phase difference film, an adhesive film, or a protective film, and generally have a thickness of about 0.15 to about 0.3 mm. Accordingly, there is a clear limit to the minimum thickness of a display device including a circularly polarizing plate due to the thickness of the plate. There is also a limit to the minimum thickness of a display device having a touch panel due to the minimum thickness of the touch panel.

SUMMARY OF CERTAIN INVENTIVE ASPECTS

One inventive aspect is a touch panel capable of not only preventing the reflection of ambient light, but also performing the functions of an input device.

Another aspect is a display device which includes a touch panel capable of not only preventing the reflection of ambient light, but also performing the functions of an input device, and can thus be formed to have a thinner shape and improved visibility.

Another aspect is a touch panel. The touch panel includes a destructive interference (DI) unit configured to include a plurality of dielectric layers and a plurality of metal layers that are alternately deposited and a transparent conductive layer configured to be disposed on the DI unit, wherein the transparent conductive layer comprises a plurality of first sensing patterns and one of the plurality of metal layers comprises a plurality of second sensing patterns.

Another aspect is a display device. The display device includes a display panel configured to include a light-emitting area and a non-light-emitting area and a touch panel configured to be formed on the display panel, wherein the touch panel includes a DI unit configured to include a plurality of dielectric layers and a plurality of metal layers that are alternately deposited and a transparent conductive layer configured to be formed on the DI unit, the transparent conductive layer includes a plurality of first sensing patterns and one of the plurality of metal layers includes a plurality of second sensing patterns.

Another aspect is a touch panel for a display device including a destructive interference (DI) unit including a plurality of dielectric layers and a plurality of metal layers that are alternately stacked, and a plurality of first sensing patterns formed over the DI unit, wherein a selected one of the metal layers includes a plurality of second sensing patterns and a plurality of non-sensing metal patterns that are alternately arranged with the second sensing patterns, and wherein the non-sensing metal patterns are substantially aligned with the first sensing metal patterns.

The second sensing patterns and the non-sensing metal patterns have a surface area that substantially fills the entire displayable area of the selected metal layer. The optical properties and the thicknesses of the dielectric layers are selected such that light reflected from at least two of the metal layer destructively interferes.

At least one of the metal layers is a light-blocking layer and the light-blocking layer includes a plurality of light-transmitting apertures. The non-sensing metal patterns are electrically insulated from the second sensing patterns and each other.

According to at least one embodiment, the touch panel not only performs the functions of an input device but can also prevent the reflection of ambient light. Accordingly, it is possible to effectively reduce the reflection of ambient light without requiring a circularly polarizing plate.

In addition, according to at least one embodiment, the display device can prevent the reflection of ambient light without requiring a circularly polarizing plate. Accordingly, it is possible to reduce the thickness of a display device while improving the visibility of images displayed on the display device.

Other features and aspects may be apparent from the following detailed description, the drawings, and the claims.

DETAILED DESCRIPTION OF CERTAIN INVENTIVE EMBODIMENTS

Figure 1:
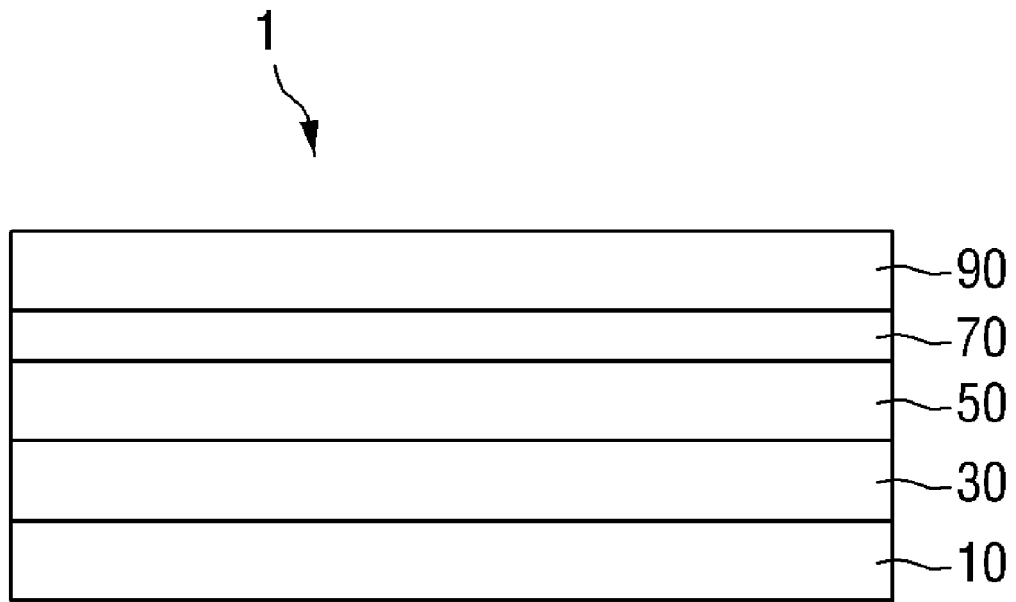
FIG. 1 is a cross-sectional view illustrating a stack structure of a display device according to an embodiment.

Advantages and features of the described technology and methods of accomplishing the same may be understood more readily by reference to the following detailed description and the accompanying drawings. The described technology may, however, be embodied in many different forms and should not be construed as being limited to the embodiments set forth herein. Rather, these embodiments are provided so that this disclosure will be thorough and complete and will fully convey the concept of the described technology to those skilled in the art, and the described technology will only be defined by the appended claims. Like reference numerals refer to like elements throughout the specification.

The terminology used herein is for the purpose of describing particular embodiments only and is not intended to be limiting of the described technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to", or "coupled to" another element or layer, it can be directly on, connected, or coupled to the other element or layer or intervening elements or layers may be present. In contrast, when an element is referred to as being "directly on", "directly connected to", or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the described technology.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both the orientation of above and below. The device may be otherwise oriented (rotated 90 degrees or at other orientations) and the spatially relative descriptors used herein are to be interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the described technology.

Unless otherwise defined, all terms (including technical and scientific terms) used herein have the same meaning as commonly understood by one of ordinary skill in the art to which the described technology belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Embodiments will hereinafter be described with reference to the accompanying drawings.

Figure 2:
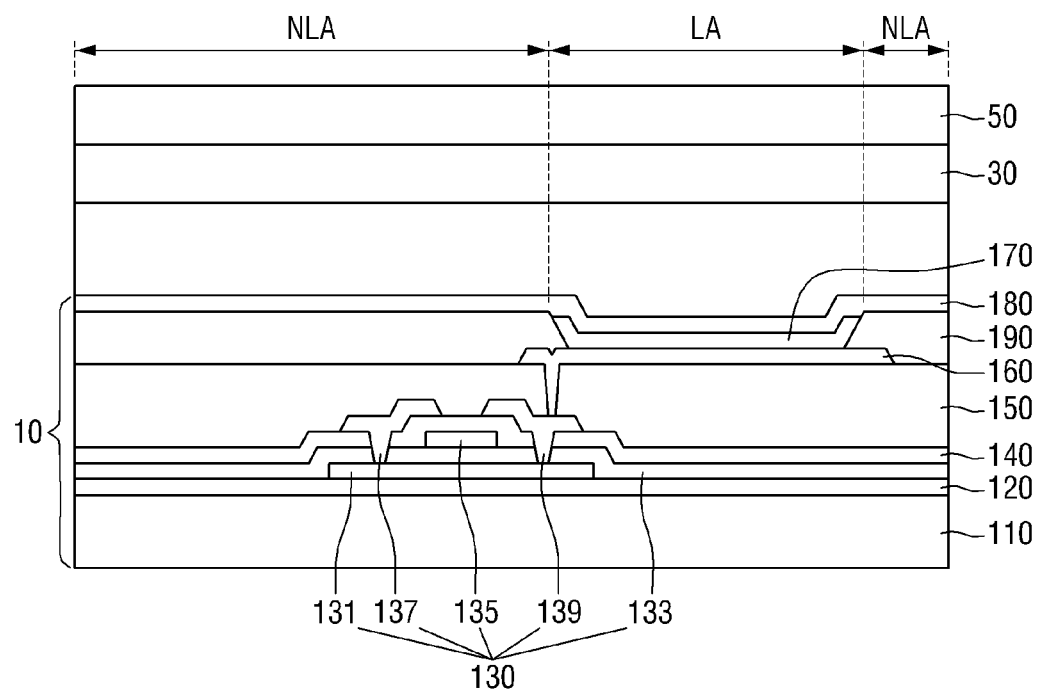
FIG. 2 is an enlarged cross-sectional view illustrating part of the display device illustrated in FIG. 1.

FIG. 1 is a cross-sectional view illustrating a stack structure of a display device according to an embodiment. FIG. 2 is an enlarged cross-sectional view illustrating part of the display device illustrated in FIG. 1.

Referring to FIG. 1, a display device 1 includes a display panel 10, a touch panel 30 formed on the display panel 10, and an encapsulation member 50 formed on the touch panel 30. The display device 1 also includes a window 90 formed on the encapsulation member 50 and an adhesive layer 70 interposed between the encapsulation member 50 and the window 90 to improve the adhesion therebetween.

Referring to FIGS. 1 and 2, the display panel 10 includes a first substrate 110, a thin film transistor (TFT) 130, a first electrode 160, a light-emitting structure or light-emitting layer 170, and a second electrode 180.

The first substrate 110 may be a transparent insulating substrate. In a non-limiting example, the first substrate 110 includes a polyimide-based resin, an acryl-based resin, a polyacrylate-based resin, a polycarbonate-based resin, a polyether-based resin, a sulfonic acid-based resin, or a polyethyleneterephthalate-based resin.

A buffer layer 120 is formed on the first substrate 110. The buffer layer 120 prevents the diffusion of metal atoms or impurities from the first substrate 110. When the surface of the first substrate 110 is irregular or uneven, the buffer layer 120 improves the flatness of the surface of the first substrate 110. The buffer layer 120 may be formed of a silicon compound. In a non-limiting example, the buffer layer 120 includes silicon oxide (SiOx), silicon nitride (SiNx), silicon oxynitride (SiOxNy), silicon oxycarbide (SiOxCy), or silicon carbonitride (SiCxNy) which may be used alone or in combination with one another. The buffer layer 120 may have a single- or multilayer structure. In an example, the buffer layer 120 may have a single- or multilayer structure including a silicon oxide layer, a silicon nitride layer, a silicon oxynitride layer, a silicon oxycarbide layer and/or a silicon carbonitride layer.

A switching device, for example, the TFT 130, is formed on the buffer layer 120. The TFT 130 includes an active layer 131, a gate insulation layer 133, a gate electrode 135, a source electrode 137, and a drain electrode 139.

The active layer 131 may be formed of, but is not limited to, polycrystalline silicon. Alternatively, the active layer 131 may be formed of an oxide semiconductor. In a non-limiting example, the active layer 131 is formed of an I-G-Z-O layer [for example, a (In2O3)a(Ga2O3)b(ZnO)c layer where a, b, and c are real numbers that respectively satisfy the conditions of a≥0, b≥0, and c>0]. When the active layer 131 is formed of an oxide semiconductor, the light transmittance of the active layer 131 may be improved.

The gate insulation layer 133 is formed on the buffer layer 120 so as to cover the active layer 131 and the gate electrode 135 is formed on the gate insulation layer 133.

The gate insulation layer 133 may be formed of silicon oxide (SiOx), silicon nitride (SiNx), or silicon oxynitride (SiON). The gate insulation layer 133 may be formed as a single layer or a multiple layer. According to some embodiments, the gate insulation layer 133 is formed as a multiple layer having a stack of a silicon nitride layer and a silicon oxide layer. In these embodiments, a silicon oxide layer is formed as the gate insulation layer 133 in areas in which to overlap the active layer 131 and a nitric oxide layer is formed below the silicon oxide layer. These embodiments are advantageous in that the active layer 131 does not contact the silicon oxide layer and can thus be prevented from deteriorating. In other embodiments, the gate insulation layer 133 is formed as a silicon oxynitride layer with a predetermined oxygen concentration distribution. In these embodiments, the gate insulation layer 133 is formed to have a higher oxygen concentration in areas close to the active layer 131 than in areas distant from the active layer 131, thereby preventing deterioration of the active layer 131.

The gate electrode 135 is formed on the gate insulation layer 133, and more specifically, on a portion of the gate insulation layer 133 above the active layer 131. The gate electrode 135 may include a metal, an alloy, a metal nitride, a conductive metal oxide, or a transparent conductive material. In a non-limiting example, the gate electrode 135 is formed of an aluminum (Al)-based metal such as aluminum or an aluminum alloy, a silver (Ag)-based metal such as silver or a silver alloy, a copper (Cu)-based metal such as copper or a copper alloy, a molybdenum (Mo)-based metal such as molybdenum or a molybdenum alloy, chromium (Cr), titanium (Ti), or tantalum (Ta). In some embodiments, the gate electrode 135 has a multilayer structure including two conductive layers (not illustrated) having different physical properties. In these embodiments, one of the conductive layers is formed of a low-resistivity metal, for example, an aluminum-based metal, a silver-based metal, or a copper-based metal, so as to reduce signal delays or voltage drops, and the other conductive layer is formed of a material with excellent contact properties with respect to other materials (particularly, zinc oxide (ZnO), indium tin oxide (ITO), or indium zinc oxide (IZO)), for example, a Mo-based metal, chromium, titanium, or tantalum. That is, the gate electrode 135 may include, but is not limited to, a chromium lower layer and an aluminum upper layer, an aluminum lower layer and a molybdenum upper layer, or a titanium lower layer and a copper upper layer. The gate electrode 135 may be formed of various metals or conductive materials other than those set forth herein.

An interlayer dielectric layer 140 is formed on the gate insulation layer 135 so as to cover the gate electrode 133 and the source and drain electrodes 137 and 139 are formed on the interlayer dielectric layer 140. That is, the interlayer dielectric layer 140 electrically insulates the gate electrode 135 from both the source and drain electrodes 137 and 139. The interlayer dielectric layer 140 may be formed of a silicon compound. In a non-limiting example, the interlayer dielectric layer 140 includes silicon oxide, silicon nitride, silicon oxynitride, silicon carbonitride, or silicon oxycarbide.

The source and drain electrodes 137 and 139 are formed on the interlayer dielectric layer 140. The source and drain electrodes 137 are separated from each other by a predetermined distance with the gate electrode 135 interposed therebetween. The source and drain electrodes 137 and 139 respectively contact a source region and a drain region of the active layer 131 through the interlayer dielectric layer 140. Each of the source and drain electrodes 137 and 139 may be formed as a single layer or a multiple layer including Ni, Co, Ti, Ag, Cu, Mo, Al, Be, Nb, Au, Fe, Se, or Ta, or an alloy of Ni, Co, Ti, Ag, Cu, Mo, Al, Be, Nb, Au, Fe, Se, or Ta and one or more elements such as Ti, Zr, W, Ta, Nb, Pt, Hf, O, or N. In a non-limiting example, each of the source and drain electrodes 137 and 139 are formed as a multiple layer, and examples of the multiple layer include a double layer of Ti/Cu, Ta/Al, Ta/Al, Ni/Al, Co/Al, or Mo (Mo alloy)/Cu, or a triple layer of Mo/Al/Mo, Ti/Al/Ti, Ta/Al/Ta, Ti/Al/TiN, Ta/Al/TaN, Ni/Al/Ni, or Co/Al/Co. The source and drain electrodes 137 and 139 are not limited to the materials and the structures set forth herein.

The TFT 130 is not limited to the structure set forth herein. That is, the TFT 130 may be formed to have various structures other than that set forth herein. The TFT 130 may be formed to have, but is not limited, a top gate structure. Alternatively, the TFT 130 may be formed to have a bottom gate structure in which the gate electrode 135 is formed below the active layer 131. Nearly all types of TFT structures, not only including those already developed and commercialized, but also including those yet to be developed, are applicable as the TFT 130.

A dielectric layer 150 is formed on the interlayer dielectric layer 140 so as to cover the source and drain electrodes 137 and 139. The dielectric layer 150 may be formed as a single layer or as a multilayer including at least two or more dielectric films. In some embodiments, the dielectric layer 150 is planarized so as to improve the flatness of the surface of the dielectric layer 150. In some embodiments, the dielectric layer 150 is planarized by performing chemical mechanical polishing (CMP) or etch-back and thus has a substantially flat top surface. The dielectric layer 150 may be formed of an organic material. In some embodiments, the dielectric layer 150 includes photoresist, an acryl-based resin, a polyimide-based resin, a polyamide-based resin, or a siloxane-based resin that may be used alone or in combination with one another. Alternatively, the dielectric layer 150 may be formed of an inorganic material such as a silicon compound, a metal, or a metal oxide. In some embodiments, the dielectric layer 150 includes silicon oxide, silicon nitride, silicon oxynitride, silicon oxycarbide, silicon carbonitride, aluminum, magnesium, zinc, hafnium, zirconium, titanium, tantalum, aluminum oxide, titanium oxide, tantalum oxide, magnesium oxide, zinc oxide, hafnium oxide, zirconium oxide, or titanium oxide which may be used alone or in combination with one another.

The first electrode 160 is formed on the dielectric layer 150 and is formed to fill a contact hole in the dielectric layer 150 and contact the drain electrode 139 exposed through the contact hole. Alternatively, a contact, a plug, or a pad may be formed on the drain electrode 139 to fill the contact hole and the first electrode 160 may electrically contact the drain electrode 139 via the contact, the plug, or the pad. The first electrode 160 may be formed of a reflective material or a transmissive material depending on the manner in which the display device 1 emits light. In some embodiments, the first electrode 160 is formed of aluminum, an aluminum alloy, silver, a silver alloy, tungsten, tungsten nitride, copper, a copper alloy, nickel, chromium, chromium nitride, molybdenum, a molybdenum alloy, titanium, titanium nitride, platinum, tantalum, tantalum nitride, neodymium, scandium, strontium, ruthenium oxide, zinc oxide, indium tin oxide, tin oxide, indium oxide, gallium oxide, or indium zinc oxide, which may be used alone or in combination with one another. The first electrode 160 may be formed as a single- or multilayer structure including a metal layer, an alloy layer, a metal nitride layer, a conductive metal oxide layer and/or a transparent conductive material layer.

A pixel-defining layer 190 is formed on the first electrode 160. The pixel-defining layer 190 may be formed of an organic material or an inorganic material. In some embodiments, the pixel-defining layer 190 is formed of photoresist, a polyacrylate-based resin, a polyimide-based resin, an acryl-based resin, or a silicon compound. The pixel-defining layer 190 may be formed on the first electrode 160 by spin coating, spraying, printing, or chemical vapor deposition (CVD). In some embodiments, an aperture through which the first electrode 160 is partially exposed is formed by etching the pixel-defining layer 190. Due to the presence of the aperture in the pixel-defining layer 190, a light-emitting area (LA) and a non-light-emitting area (NLA) are defined in the display device 1. That is, the area where the aperture of the pixel-defining layer 190 is located is the light-emitting areas LA and the other areas of the display device 1, for example, areas near the aperture of the pixel-defining layer 190, are the non-light-emitting areas NLA.

The light-emitting structure 170 is formed on the first electrode 160 which is exposed through the aperture of the pixel-defining layer 190. The light-emitting structure 170 may extend onto the sidewalls of the aperture of the pixel-defining layer 190. In some embodiments, the light-emitting structure 170 has a multilayer structure including an organic electroluminescence (EL) layer, a hole injection layer (HIL), a hole transport layer (HTL), an electron transport layer (ETL), and an electron injection layer (EIL). The organic EL layer of the light-emitting structure 170 may be formed using a plurality of light-emitting materials so that a plurality of pixels can emit different colors of light such as red light, green light, and blue light. Alternatively, the organic EL layer light-emitting structure 170 may be formed using a stack of a plurality of light-emitting materials emitting different colors of light such as red light, green light and blue light, so as to emit white light.

The second electrode 180 is formed on the pixel-defining layer 190 and the light-emitting structure 170. The second electrode 180, like the first electrode 160, may be formed of a transmissive material or a reflective material depending on the manner in which the display device 1 emits light. In some embodiments, the second electrode 180 is formed of aluminum, an aluminum alloy, aluminum nitride, silver, a silver alloy, tungsten, tungsten nitride, copper, a copper alloy, nickel, chromium, chromium nitride, molybdenum, a molybdenum alloy, titanium, titanium nitride, platinum, tantalum, tantalum nitride, neodymium, scandium, strontium, ruthenium oxide, zinc oxide, indium tin oxide, tin oxide, indium oxide, gallium oxide, or indium zinc oxide, which may be used alone or in combination with one another. The second electrode 180 may be formed by printing, sputtering, CVD, atomic layer deposition (ALD), vacuum deposition, or pulse laser deposition. The second electrode 180, like the first electrode 160, may be formed as a single- or multilayer structure including a metal layer, an alloy layer, a metal nitride layer, a conductive metal oxide layer and/or a transparent conductive material layer.

The touch panel 30 is formed on the display panel 10. The touch panel 30 includes a destructive interference (DI) unit and a transparent conductive layer. The touch panel 30 will be described later in further detail. A predetermined space may be provided between the second electrode 180 and the touch panel 30 and the predetermined space may be filled with an inert gas such as air or nitrogen ($N_2$). A passivation layer (not illustrated) may be additionally disposed between the second electrode 180 and the touch panel 30. In a non-limiting example, the passivation layer is formed of photoresist, an acryl-based resin, a polyimide-based resin, a polyamide-based resin, or a siloxane-based resin.

Referring back to FIG. 1, the encapsulation member 50 is formed on the touch panel 30. The encapsulation member 50 is a transparent insulating substrate. In some embodiments, the encapsulation member 50 is formed of glass, quartz, or a transparent insulating resin.

The window 90 is formed on the encapsulation member 50. The window 90 may be fixed onto the encapsulation member 50 by the adhesive layer 70. The adhesive layer 70 may be formed of a rubber-based adhesive, an acryl-based adhesive, a vinyl ether-based adhesive, a silicon-based adhesive, a urethane-based adhesive, or a pressure-sensitive adhesive.

The window 90 may include a transparent material such as glass or a polymer material. The window 90 protects the display panel 10 and the touch panel 30 from any external shock.

Figure 3:
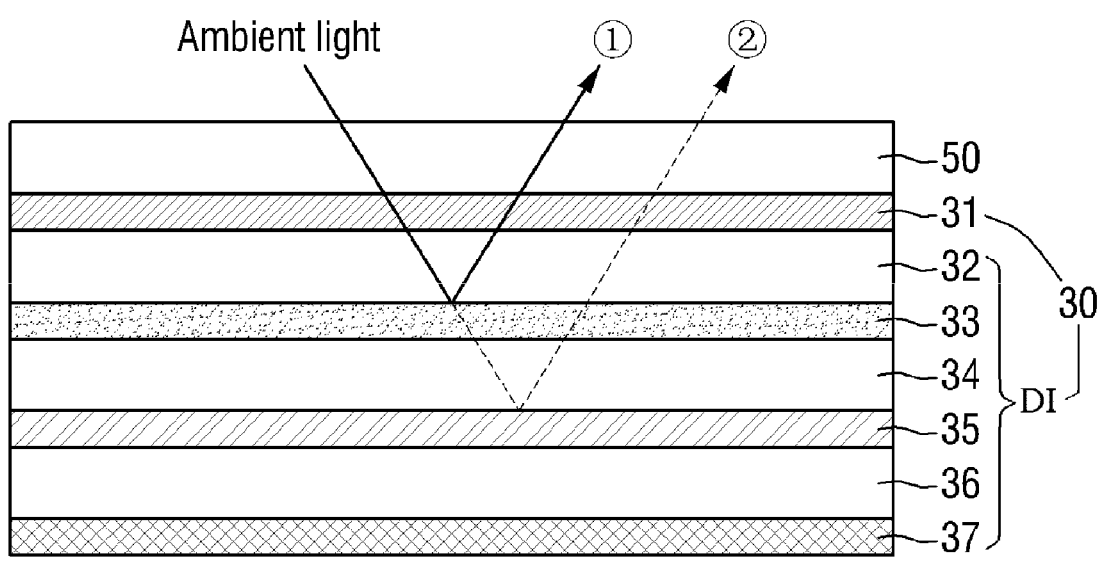
FIG. 3 is a cross-sectional view illustrating the stack structure of a touch panel of the display device illustrated in FIG. 1.

FIG. 3 is a cross-sectional view illustrating the stack structure of the touch panel 30 of the display device 1.

Referring to FIGS. 1 and 3, the touch panel 30 is formed below the encapsulation member 50. The touch panel 30 includes a destructive interference (DI) unit DI and a transparent conductive layer 31 formed on the destructive interference unit DI.

The destructive interference unit DI reduces the reflection of ambient light incident upon the encapsulation member 50 by causing destructive interference in the reflected light to offset the reflections of the ambient light. Destructive interference is a phenomenon in which beams of light are reflected from the interface between two media to have the same amplitude and have a phase difference of about 180 degrees therebetween and thereby offset each other.

The destructive interference unit DI includes a plurality of metal layers and a plurality of dielectric layers which are alternately arranged. In some embodiments, the destructive interference unit DI includes a first dielectric layer 32, a first metal layer 33, a second dielectric layer 34, and a second metal layer 35.

The first dielectric layer 32 is formed below the encapsulation member 50. The first dielectric layer 32 serves as a phase matching layer or a phase compensation layer. More specifically, since it is difficult to precisely set reflections of ambient light, which encompass nearly all wavelengths, to have a phase difference of about 180 degrees, the first dielectric layer 32 partially corrects reflections of ambient light, depending on the wavelength of the ambient light, such that the phase difference between the reflections of the ambient light cannot exceed 180 degrees. In a non-limiting example, the first dielectric layer 32 includes a material such as silicon oxide ($SiO_2$), titanium oxide ($TiO_2$), lithium fluoride (LiF), calcium fluoride ($CaF_2$), magnesium fluoride ($MgF_2$), silicon nitride (SiNx), tantalum oxide ($Ta_2O_5$), niobium oxide ($Nb_2O_5$), silicon carbonitride (SiCN), molybdenum oxide (MoOx), iron oxide (FeOx), chromium oxide (CrOx), or strontium oxide ($SnO_2$), which may be used alone or in combination with one another.

The first metal layer 33 is formed below the first dielectric layer 32. The first metal layer 33 absorbs a portion of the incident light and reflects a portion of the incident light. To absorb some of ambient light incident upon the destructive interference unit DI and thus to reduce the reflection of the ambient light, the first metal layer 33 may be formed of a material with high light absorptivity, for example, a material containing metal and having a light absorptivity of about 30% or greater. This material may have a refractive index of about 1.5 to about 7 and an absorption coefficient of 1.5 to 7. In some embodiments, the first metal layer 33 includes a materials such as chromium (Cr), molybdenum (Mo), tungsten (W), titanium (Ti), nickel (Ni), cobalt (Co), copper oxide (CuO), titanium nitride (TiNx), nickel sulfide (NiS), or an alloy thereof, which may be used alone or in connection with one another.

The second dielectric layer 34 is formed below the first metal layer 33. The second dielectric layer 34, like the first dielectric layer 32, serves as a phase matching layer or a phase compensation layer and includes a material such as silicon oxide ($SiO_2$), titanium oxide ($TiO_2$), lithium fluoride (LiF), calcium fluoride ($CaF_2$), magnesium fluoride ($MgF_2$), silicon nitride (SiNx), tantalum oxide ($Ta_2O_5$), niobium oxide ($Nb_2O_5$), silicon carbonitride (SiCN), molybdenum oxide (MoOx), iron oxide (FeOx), chromium oxide (CrOx), or strontium oxide ($SnO_2$).

The second metal layer 35 is formed below the second dielectric layer 34. The second metal layer 35, like the first metal layer 33, may be formed of a material containing metal with a light absorptivity of about 30% or greater, and may include a material such as chromium (Cr), molybdenum (Mo), tungsten (W), titanium (Ti), nickel (Ni), cobalt (Co), copper oxide (CuO), titanium nitride (TiNx), nickel sulfide (NiS), or an alloy thereof, which may be used alone or in connection with one another.

Ambient light incident upon the destructive interference unit DI is reflected from the surface of the first metal layer 33 so as to undergo a phase change of about 180 degrees, thereby obtaining first reflected light ①. Some of the ambient light passes through the first metal layer 33 and the first dielectric layer 32 so as to undergo a phase change of about 90 degrees. This light is reflected from the surface of the second metal layer 35 so as to undergo a phase change of about 180 degrees and passes back through the first dielectric layer 32 and the first metal layer 33 so as to undergo another phase change of about 90 degrees, thereby obtaining second reflected light ②. That is, the ambient light undergoes a total phase change of about 360 degrees to generate the second reflected light ②. The first reflected light ① and the second reflected light ② have a phase difference of about 180 degrees and can thus offset each other and disappear. As a result, the destructive interference unit DI can replace the circularly polarizing plate of the standard display device, can reduce the thickness of the display device 1 while improving the visibility of the display device 1, and can simplify the structure of the display device 1.

The destructive interference unit DI may also include at least one of a third metal layer 37 and/or a third dielectric layer 36.

The third metal layer 37 is formed below the second metal layer 35. The third dielectric layer 36 is interposed between the third metal layer 37 and the second metal layer 35.

In some embodiments, third metal layer 37 is a light-blocking layer. The third metal layer 37 corresponds to the non-light-emitting area NLA of the display panel 1 and is formed closer to the display panel 10 than the rest of the destructive interference unit DI. In some embodiments, the third metal layer 37 is formed of a material such as chromium (Cr), molybdenum (Mo), aluminum (Al), silver (Ag), titanium (Ti), carbon black, or copper oxide (CuO). The third metal layer 37 is formed to have a thickness such that ambient light incident upon the destructive interference unit DI can be substantially blocked from penetrating into the light-emitting area LA of the display panel 10. In a non-limiting example, the third metal layer 37 is formed to have a thickness of about 50 nm or greater.

The first or second metal layer 33 or 25 may be formed to serve as a light-blocking layer. In some embodiments, the first metal layer 33 is a light-blocking layer, and thus, the second and third metal layers 35 and 37 prevent the reflection of ambient light through DI. In other embodiments, the second metal layer 35 is a light-blocking layer, and thus, the first and third metal layers 33 and 37 prevent the reflection of ambient light through DI.

The third dielectric layer 36 is formed between the second metal layer 35 and the third metal layer 37. The description of the first dielectric layer 32 or the second dielectric layer 34 is directly applicable to the third dielectric layer 36, and thus, a detailed description of the third dielectric layer 36 will be omitted. In some embodiments, the destructive interference unit DI includes the third dielectric layer 36. However, the described technology is not limited to the inclusion of the third dielectric layer 36. That is, the third dielectric layer 36 is optional.

The transparent conductive layer 31 is formed on the destructive interference unit DI. That is, the transparent conductive layer 31 is formed between the destructive interference unit DI and the encapsulation member 50. The transparent conductive layer 31 includes a plurality of patterns and the patterns are first sensing patterns of the touch panel 30. In a non-limiting example, the transparent conductive layer 31 is formed of a transparent conductive oxide such as IZO, TTO, or zinc oxide (ZnO).

One of the first metal layer 33, the second metal layer 35, and the third metal layer 37 includes a plurality of second sensing pattern of the touch panel 30. That is, one of the first metal layer 33, the second metal layer 35, and the third metal layer 37 of the destructive interference unit DI not only contributes to the prevention of the reflection of ambient light (or the destructive interference of ambient light), but also performs the functions of sensing patterns of the touch panel 30.

Hereinafter, an embodiment will be described wherein the first metal layer 33 includes the second sensing patterns of the touch panel 30.

Figure 4:
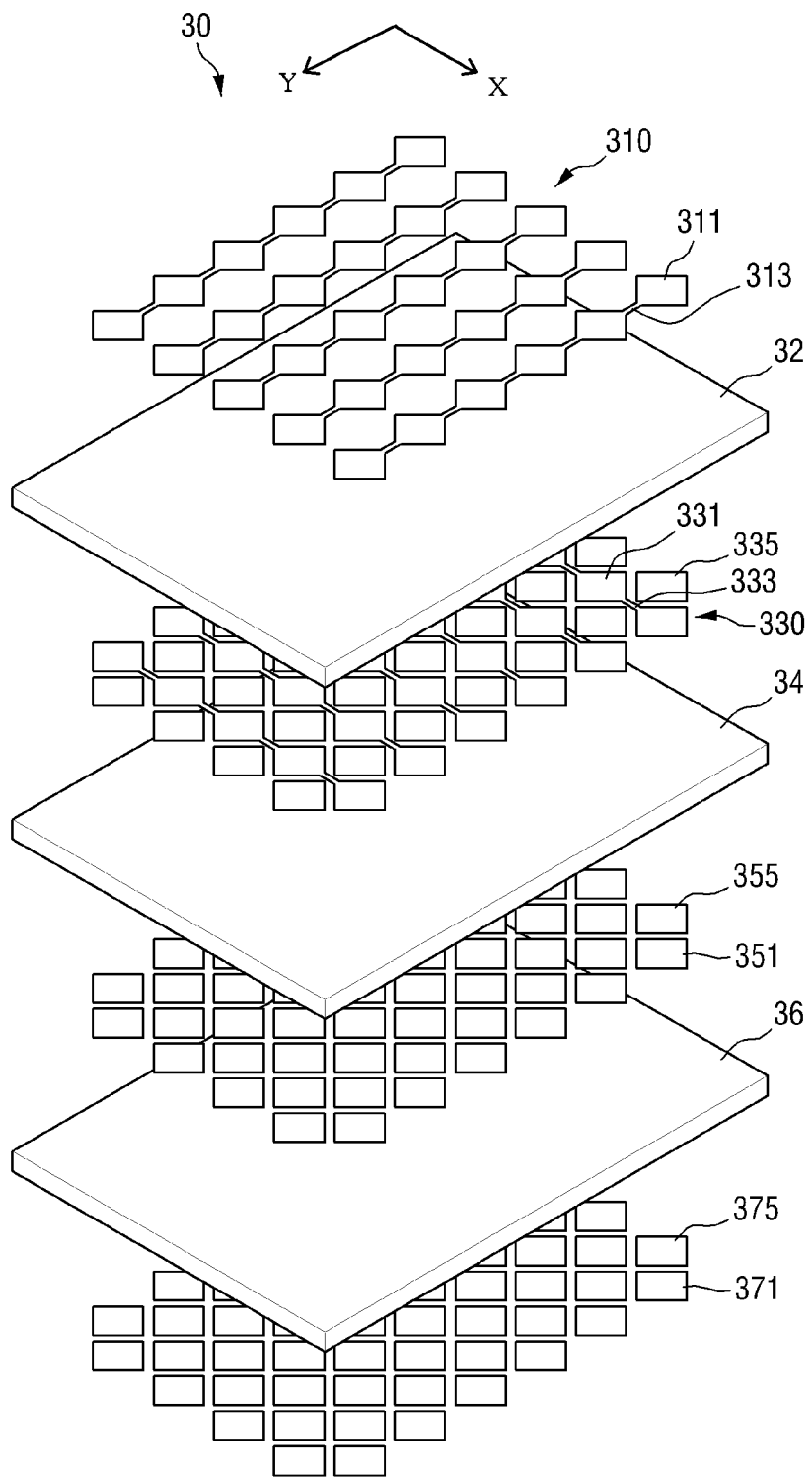
FIG. 4 is an exploded perspective view illustrating an example of the touch panel of the display device illustrated in FIG. 1.
Figure 5:
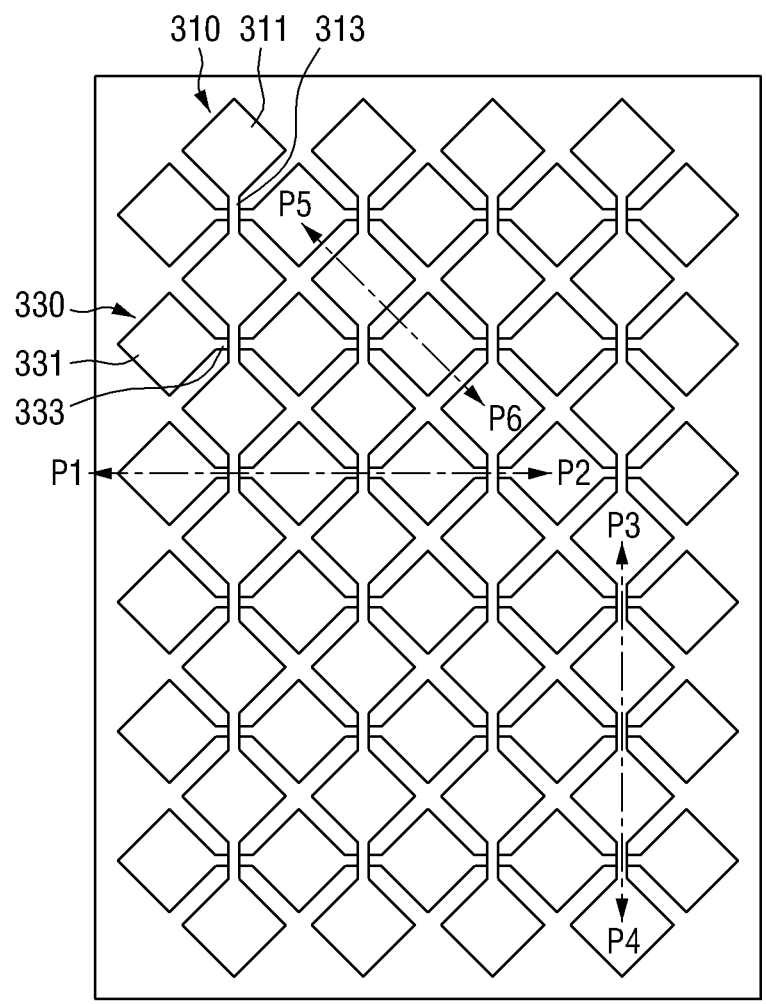
FIG. 5 is a plan view illustrating an example of the touch panel of the display device illustrated in FIG. 1.
Figure 6:
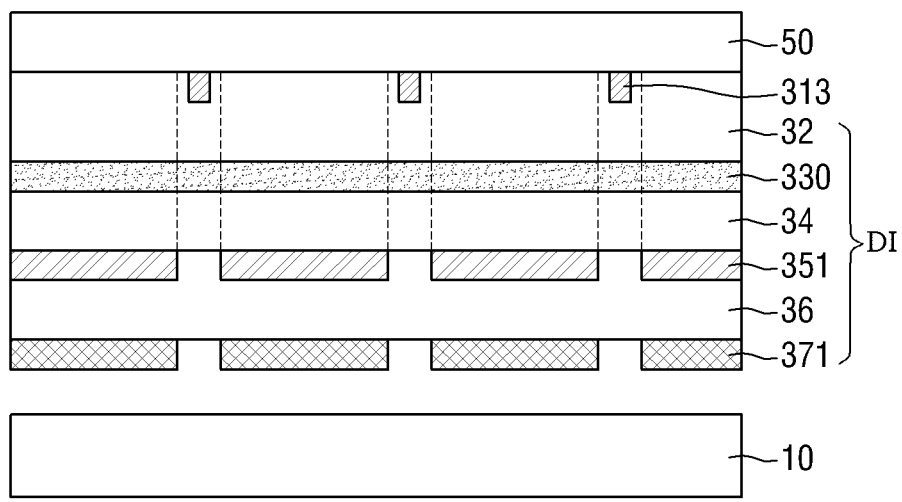
FIGS. 6 to 8 are partial cross-sectional views illustrating an example of the touch panel of the display device illustrated in FIG. 1.
Figure 7:
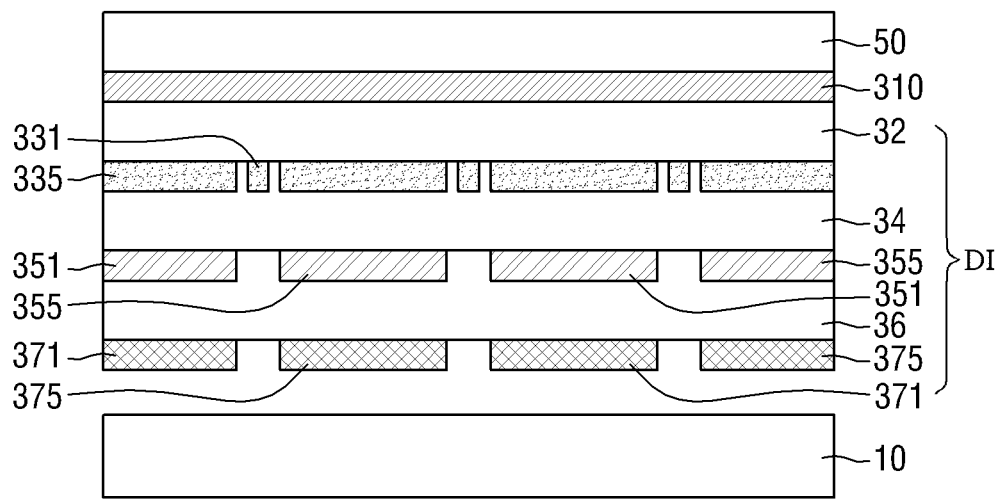
Figure 8:
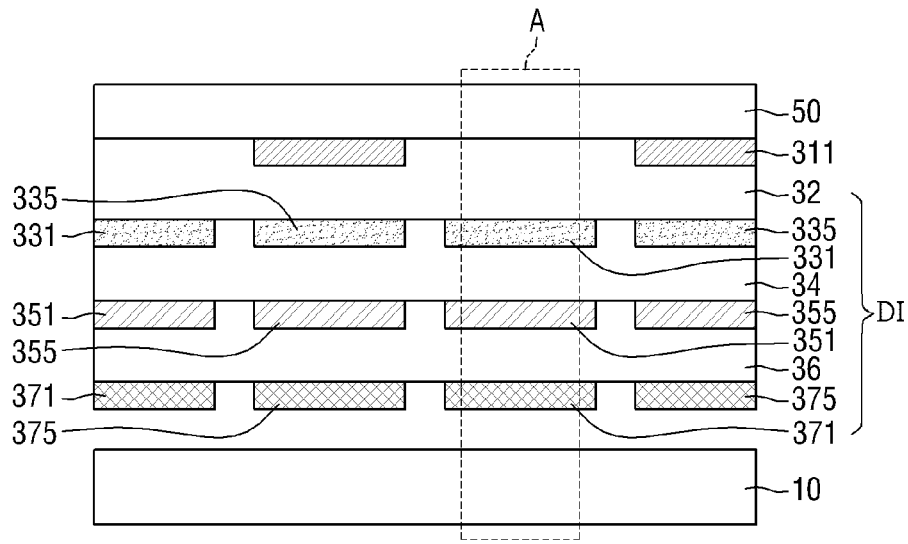

FIG. 4 is an exploded perspective view illustrating an example of the touch panel 30 of the display device 1. FIG. 5 is a plan view illustrating an example of the touch panel 30 of the display device 1. More specifically, FIG. 5 is a plan view of the touch panel illustrated in FIG. 4. FIGS. 6 to 8 are partial cross-sectional views illustrating an example of the touch panel 30 of the display device 1. More specifically, FIG. 6 is a cross-sectional view taken along line P1-P2 of FIG. 5, FIG. 7 is a cross-sectional view taken along line P3-P4 of FIG. 5, and FIG. 8 is a cross-sectional view taken along line P5-P6 of FIG. 5.

Referring to FIGS. 3 to 8, the touch panel 30 includes the transparent conductive layer 31, the first dielectric layer 32, the first metal layer 33, the second dielectric layer 34, the second metal layer 35, the third dielectric layer 36, and the third metal layer 37.

The transparent conductive layer 31, which is formed on the first dielectric layer 32, i.e., between the encapsulation member 50 and the first dielectric layer 32, includes a plurality of first sensing patterns 310. The first sensing patterns 310 extend in a first direction (or a Y-axis direction). The first sensing patterns 310 are separated from each another in a second direction (or an X-axis direction).

The first sensing patterns 310 include a plurality of first sensing cells 311 and a plurality of first connectors 313. In a non-limiting example, the first sensing cells 311 are rhombus- or diamond-shaped. Alternatively, the first sensing cells 311 may have various shapes other than a rhombus- or diamond shape, such as a circular shape, an elliptical shape, or a polygonal shape. A pair of adjacent first sensing cells 311 are spaced apart from each other in the first direction (i.e., the Y-axis direction) or the second direction (i.e., the X-axis direction). The pair of first sensing cells 311 which are adjacent in the first direction (i.e., the Y-axis direction) are electrically connected to each other by a first connector 313. That is, each of the first connectors 313 connects a number of first sensing cells 311 having the same X-axis coordinate. The transparent conductive layer 31 is illustrated as, but is not limited to, including only the first sensing patterns 310. That is, the transparent conductive layer may also include a plurality of floated transparent conductive patterns between the first sensing patterns 310, if necessary.

In some embodiments, the first sensing patterns 310 are formed before the formation of the first dielectric layer 32. In these embodiments, the first sensing patterns 310 are formed directly on the bottom surface of the encapsulation member 50. The first dielectric layer 32 is formed on the first sensing patterns 310 and the areas where the first sensing patterns 310 are not formed are filled with the first dielectric layer 32. That is, after forming the first sensing patterns 310 on the bottom surface of the encapsulation member 50, the first dielectric layer 32 is formed to cover the first sensing pattern 310 and the bottom surface of the encapsulation member 50.

The first metal layer 33 is formed below the first dielectric layer 32, i.e., between the first dielectric layer 32 and the second dielectric layer 34. The first metal layer 33 includes a plurality of sensing patterns 330 and a plurality of first metal patterns or non-sensing metal patterns 335 formed among the second sensing patterns 330.

The second sensing patterns 330 extend in the second direction (or the X-axis direction). The second sensing patterns 330 are spaced apart from each another in the first direction (or the Y-axis direction).

The second sensing patterns 330 include a plurality of second sensing cells 331 and a plurality of second connectors 333. In a non-limiting example, the second sensing cells 331 are rhombus- or diamond-shaped. Alternatively, the second sensing cells 331 may have various shapes other than a rhombus- or diamond shape, such as a circular shape, an elliptical shape, or a polygonal shape. A pair of adjacent second sensing cells 331 are spaced apart from each other in the first direction (i.e., the Y-axis direction) or the second direction (i.e., the X-axis direction). The pair of second sensing cells 331 which are adjacent in the second direction (i.e., the X-axis direction) are connected to each other by a second connector 333. That is, each of the second connectors 333 connects a number of second sensing cells 331 having the same Y-axis coordinate. The second sensing cells 331 are arranged so as to not substantially overlap the first sensing cells 311.

The first metal patterns 335 are formed among the second sensing patterns 330. The first metal patterns 335 are physically separate from the second sensing patterns 330. A pair of first metal patterns 335 adjacent in the second direction (i.e., the X-axis direction) are spaced apart from each other. That is, the first metal patterns 335 are floated metal patterns. Thus, the first metal patterns 335 are not electrically connected to a power source. According to some embodiments, the first metal patterns 335 substantially overlap the first sensing cells 311. Thus, the first metal patterns 355 are formed below the first sensing cells 311. As shown in FIGS. 4 and 5, the second sensing cells 331 and the first metal patterns 335 substantially fill the entire first metal layer 33.

The second sensing patterns 330 and the first metal patterns 335 are all included in the first metal layer 33, and in some embodiments, are formed of the same material. The description of the material of the first metal layer 33 is directly applicable to the second sensing patterns 330 and the first metal patterns 335, and thus, a detailed description of the material of the second sensing patterns 330 and the first metal patterns 335 will be omitted.

In some embodiments, the second sensing patterns 330 and the first metal patterns 335 are formed before the formation of the second dielectric layer 34. In these embodiments, the second sensing patterns 330 and the first metal patterns 335 are formed directly on the bottom surface of the first dielectric layer 32. The second dielectric layer 34 is formed on the second sensing patterns 330 and the first metal patterns 335 and the areas where the second sensing patterns 330 and the first metal patterns 335 are not formed are filled with the second dielectric layer 34. That is, after forming the second sensing patterns 330 and the first metal patterns 335 directly on the bottom surface of the first dielectric layer 32, the second dielectric layer 34 is formed to cover the second sensing patterns 330, the first metal patterns 335 and the bottom surface of the first dielectric layer 32.

In response to the top of the touch panel 30 (for example, the top of the window 90 of FIG. 1) being touched by a hand or an object, a resulting variation in capacitance corresponding to the location of the touch panel 30 touched by the hand or the object is transmitted to a driving circuit via first and second sensing patterns 310 and 330, metal wiring (not illustrated), and a location detection line (not illustrated). The location of the touched portion of the touch panel 30 is identified by converting the capacitance variation into an electrical signal.

The second metal layer 35 is formed below the second dielectric layer 34, i.e., between the second dielectric layer 34 and the third dielectric layer 36. The second metal layer 35 includes a plurality of second metal patterns 351 and a plurality of third metal patterns 355.

The second metal patterns 351 overlap the second sensing patterns 330. That is, the second metal patterns 351 are interposed between the second dielectric layer 34 and the third dielectric layer 36 in areas corresponding to the second sensing patterns 330. The second metal patterns 351 have the same shape as the second sensing cells 331. In a non-limiting example, the second metal patterns 351 are rhombus- or diamond-shaped. Alternatively, the second metal patterns 351 may have various shapes other than a rhombus- or diamond shape, such as a circular shape, an elliptical shape, or a polygonal shape. The second metal patterns 351 have the same pattern of arrangement as the second sensing cells 331. That is, a pair of second metal patterns 351 which are adjacent in the first direction (i.e., the Y-axis direction) are spaced apart from each other.

Alternatively, the second metal patterns 351 have the same shape as the second sensing patterns 330. The second sensing patterns 351 are illustrated as, but are not limited to, being spaced apart from one another in the first direction (i.e., the Y-axis direction). In some embodiments, the second metal patterns 351 include the equivalents of the second connectors 333 of the second sensing patterns 330.

The third metal patterns 355 overlap the first metal patterns 335. That is, the third metal patterns 355 are formed between the second dielectric layer 34 and the third dielectric layer 36 in areas corresponding to the first metal patterns 335. The third metal patterns 355 have the same shape as the first metal patterns 335. In a non-limiting example, the third metal patterns 355 are rhombus- or diamond-shaped. Alternatively, the third metal patterns 355 may have various shapes other than a rhombus- or diamond shape, such as a circular shape, an elliptical shape, or a polygonal shape.

The second and third metal patterns 351 and 355 are all included in the second metal layer 35, and in some embodiments, are formed of the same material. The description of the material of the second metal layer 35 is directly applicable to the second metal patterns 351 and the third metal patterns 355, and thus, a detailed description of the material of the second metal patterns 351 and the third metal patterns 355 will be omitted.

In some embodiments, the second and third metal patterns 351 and 355 are formed before the formation of the third dielectric layer 36. In these embodiments, the second and third metal patterns 351 and 355 are formed directly on the bottom surface of the second dielectric layer 34. The third dielectric layer 36 is formed on the second and third metal patterns 351 and 355 and areas in which the second and third metal patterns 351 and 355 are not formed are filled with the third dielectric layer 36. That is, after forming the second and third metal patterns 351 and 355 directly on the bottom surface of the second dielectric layer 34, the third dielectric layer 36 is formed to cover the second metal patterns 351, the third metal patterns 355, and the bottom surface of the second dielectric layer 34.

The third metal layer 37 is formed below the third dielectric layer 36. The third metal layer 37 includes a plurality of fourth metal patterns 371 and a plurality of fifth metal patterns 375.

The fourth metal patterns 371 overlap the second sensing patterns 330. That is, the fourth metal patterns 371 are formed below the third dielectric layer 36 in areas corresponding to the second sensing patterns 330. The fourth metal patterns 371 have the same shape as the second sensing cells 331 or the second sensing patterns 330. The description of the shape of the second metal patterns 351 is directly applicable to the fourth metal patterns 371, and thus, a detailed description of the shape of the fourth metal patterns 371 will be omitted.

The fifth metal patterns 375 overlap the first metal patterns 335. That is, the fifth metal patterns 375 are formed below the third dielectric layer 36 in areas corresponding to the first metal patterns 335. The fifth metal patterns 375 have the same shape as the first metal patterns 335. The description of the shape of the second metal patterns 351 is directly applicable to the third metal patterns 355, and thus, a detailed description of the shape of the fifth metal patterns 375 will be omitted.

The second sensing patterns 330, the second metal patterns 351, and the fourth metal patterns 371 all have the same shape and are formed in the same area when viewed from above. Accordingly, the second sensing patterns 330, the second metal patterns 351, and the fourth metal patterns 371 can be formed using the same mask. Therefore, it is possible to simplify the manufacture of the display device 1 and reduce the manufacturing cost by reducing the number of masks required to manufacture the display device 1.

Similarly, the first metal patterns 335, the third metal patterns 355, and the fifth metal patterns 375 all have the same shape and are formed in the same area when viewed from above. Accordingly, the first metal patterns 335, the third metal patterns 355, and the fifth metal patterns 375 can be formed using the same mask. Therefore, it is possible to simplify the manufacture of the display device 1 and reduce the manufacturing cost of the display device 1 by reducing the number of masks required to manufacture the display device 1.

By using a single mask having a first pattern unit corresponding to the second sensing patterns 330, the second metal patterns 351, and the fourth metal patterns 371 and a second pattern unit corresponding to the first metal patterns 335, the third metal patterns 355, and the fifth metal patterns 375, the second sensing patterns 330 and the first metal patterns 335 can be formed together at the same time, the second metal patterns 351 and the third metal patterns 355 can be formed together at the same time, and the fourth metal patterns 371 and the fifth metal patterns 375 can be formed together at the same time.

The touch panel 30 uses one of the metal layers included in the destructive interference unit DI as a sensing pattern layer and can thus prevent the reflection of ambient light while properly sensing touch input. Accordingly, since there is no need to additionally provide a touch sensing device and a circularly polarizing plate, it is possible to reduce the thickness of the display device 1 and simplify the structure of the display device 1. In addition, since the touch panel 30 can prevent the reduction of ambient light, it is possible to improve the visibility of images displayed on the display device 1.

Figure 9:
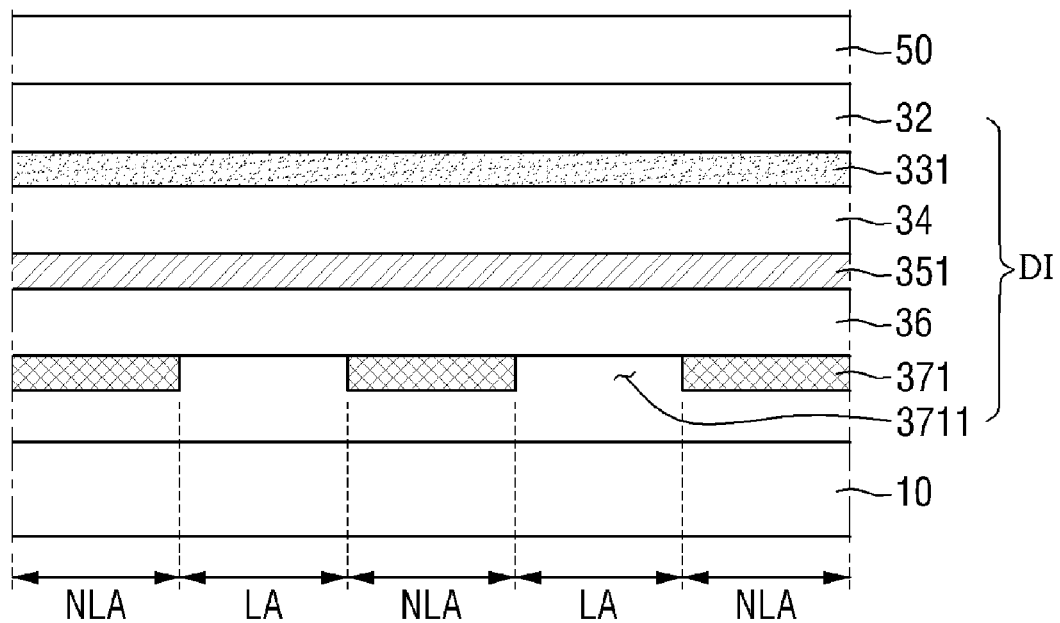
FIG. 9 is an enlarged cross-sectional view of part of the touch panel illustrated in FIG. 8.

FIG. 9 is an enlarged cross-sectional view of part of the touch panel illustrated in FIG. 8. More specifically, FIG. 9 is an enlarged cross-sectional view of portion A of FIG. 8.

Referring to the embodiment of FIGS. 3 to 9, the third metal layer 37 is a light-blocking layer. As already discussed with reference to FIG. 3, the presence of a light-blocking layer substantially prevents the penetration of ambient light incident upon the destructive interference unit DI into the light-emitting area LA of the display panel 10 and the reflection of the ambient light from the non-light-emitting area NLA of the display panel 10 to the environment.

When the third metal layer 37 is a light-blocking layer, the fourth metal patterns 371 of the third metal layer 37 include a plurality of light-transmitting apertures 3711 formed in areas of the third metal layer 37 corresponding to the light-emitting area LA of the display area 10. Light emitted from the light-emitting area (LA) is emitted from the display panel 10 via the light-transmitting apertures 3711.

Even though not specifically illustrated, the fifth metal patterns 375 also include a plurality of light-transmitting apertures 3711 which are formed in areas of the third metal layer 37 corresponding to the light-emitting area LA of the display area 10.

Figure 10:
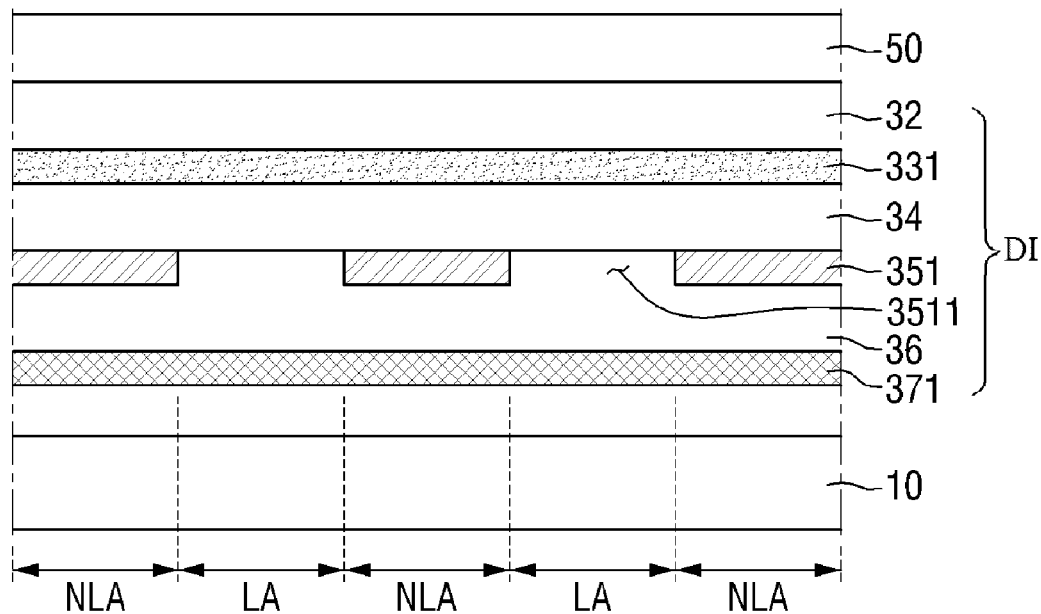
FIGS. 10 and 11 are enlarged cross-sectional views illustrating additional embodiments of the touch panel illustrated in FIG. 9.
Figure 11:
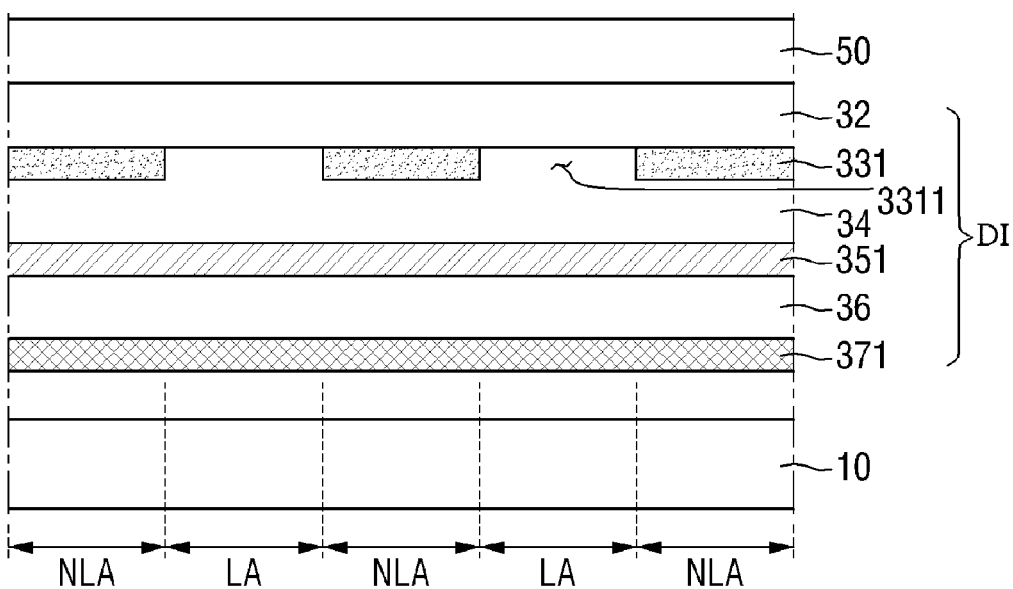

FIGS. 10 and 11 are enlarged cross-sectional views illustrating additional embodiments of the touch panel illustrated in FIG. 9.

Referring to the embodiment of FIGS. 3 to 8 and 10, the second metal layer 35 is a light-blocking layer. When the second metal layer 35 is a light-blocking layer, the second metal patterns 351 of the second metal layer 35 include a plurality of light-transmitting apertures 3511 formed in areas of the second metal layer 35 corresponding to the light-emitting area LA of the display area 10. Light emitted from the light-emitting area (LA) is emitted from the display panel 10 via the light-transmitting apertures 3511.

Even though not specifically illustrated, the third metal patterns 355 also include a plurality of light-transmitting apertures 3511 which are formed in areas of the second metal layer 35 corresponding to the light-emitting area LA of the display area 10.

Referring to the embodiment of FIGS. 3 to 8 and 11, the first metal layer 33 is a light-blocking layer. When the first metal layer 33 is a light-blocking layer, the second sensing cells 331 of the first metal layer 33 include a plurality of light-transmitting apertures 3311 formed in areas of the first metal layer 33 corresponding to the light-emitting area LA of the display area 10. Light emitted from the light-emitting area (LA) is emitted from the display panel 10 via the light-transmitting apertures 3311.

Even though not specifically illustrated, the second connectors 333 or the first metal patterns 335 also include a plurality of light-transmitting apertures 3311 which are formed in areas of the first metal layer 33 corresponding to the light-emitting area LA of the display area 10.

Figure 12:
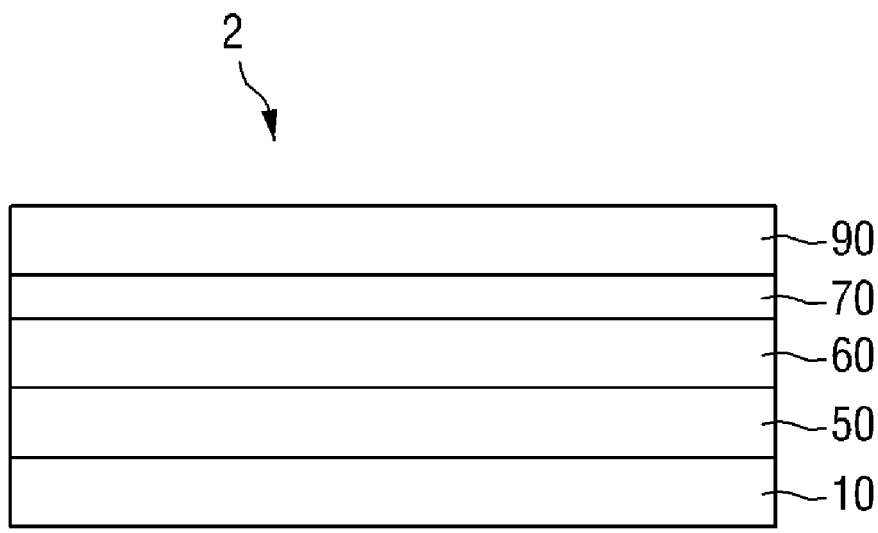
FIG. 12 is a cross-sectional view illustrating a stack structure of a display device according to another embodiment.

FIG. 12 is a cross-sectional view illustrating the stack structure of a display device according to another embodiment. Referring to FIG. 12, a display device 2 includes a display panel 10, an encapsulation member 50 formed on the display panel 10, and a touch panel 60 formed on the encapsulation member 50. The display device 2 also includes a window 90 formed on the touch panel 60 and an adhesive layer 70 interposed between the touch panel 60 and the window 90 to improve the adhesion therebetween. The display device 2 is substantially identical, or at least similar, to the display panel 1 of FIG. 1, except that the touch panel 60 is formed on the encapsulation member 50. Thus, the following description will focus mainly on the differences with the display device 1.

The encapsulation member 50 is formed on the display panel 10 of the display device 2. The encapsulation member 50 is a transparent insulating substrate. In some embodiments, the encapsulation member 50 is formed of glass, quartz, or a transparent insulating resin. The space between the encapsulation member 50 and the display panel 10 is filled with an inert gas such as air or nitrogen ($N_2$). A passivation layer (not illustrated) may be additionally formed between the display panel 10 and the encapsulation member 50. In a non-limiting example, the passivation layer is formed of photoresist, an acryl-based resin, a polyimide-based resin, a polyamide-based resin, or a siloxane-based resin. In another non-limiting example, the passivation layer may serve as the encapsulation member 50. That is, a transparent insulating resin that covers the top of the display panel 10 may be provided as the encapsulation member 50, rather than additionally providing an additional transparent insulating substrate as the encapsulation member 50.

The touch panel 60 is formed on the encapsulation member 50. The touch panel 60 includes a DI unit and a transparent conductive layer. The touch panel 60 will be described later in further detail.

The window 90 is formed on the touch panel 60. The window 90 is fixed onto the touch panel 60 by the adhesive layer 70. The adhesive layer 70 may be formed of a rubber-based adhesive, an acryl-based adhesive, a vinyl ether-based adhesive, a silicon-based adhesive, a urethane-based adhesive, or a pressure-sensitive adhesive.

Figure 13:
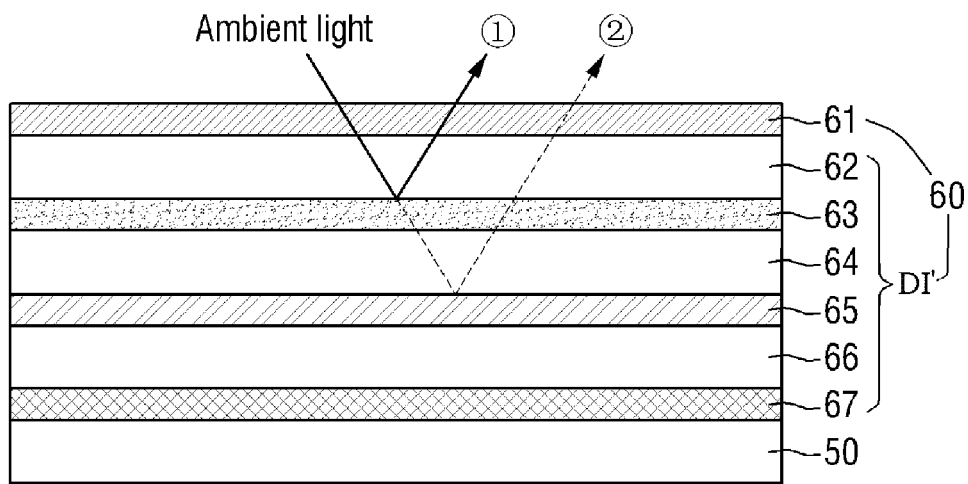
FIG. 13 is a cross-sectional view illustrating the stack structure of a touch panel of the display device illustrated in FIG. 12.

FIG. 13 is a cross-sectional view illustrating the stack structure of the touch panel 60 of the display device 2.

Referring to FIGS. 12 and 13, the touch panel 60 is formed on the encapsulation member 50. The touch panel 60 includes a destructive interference unit DI' and a transparent conductive layer 61 formed on the destructive interference unit DI'.

The destructive interference unit DI' reduces the reflection of ambient light incident upon the touch panel 60 by causing destructive interference in the reflected light to offset the reflections of the ambient light. Destructive interference is a phenomenon in which beams of light are reflected from the interface between two media to have the same amplitude and have a phase difference of about 180 degrees therebetween the thereby offset each other.

The destructive interference unit DI' includes a plurality of metal layers and a plurality of dielectric layers which are alternately arranged. In some embodiments, the destructive interference unit DI' includes a first dielectric layer 62, a first metal layer 63, a second dielectric layer 64, and a second metal layer 65. In other embodiments, the destructive interference unit DI' also includes a third dielectric layer 66 and/or a third metal layer 67. The first dielectric layer 62, the first metal layer 63, the second dielectric layer 64, the second metal layer 65, the third dielectric layer 66, and the third metal layer 67 are substantially identical, or at least similar, to the first dielectric layer 32, the first metal layer 33, the second dielectric layer 34, the second metal layer 35, the third dielectric layer 36, and the third metal layer 37, respectively, of FIG. 3, and thus, detailed descriptions thereof will be omitted.

The first dielectric layer 62 is formed at the top of the destructive interference unit DI'. The first dielectric layer 62 serves as a phase matching layer or a phase compensation layer. In a non-limiting example, the first dielectric layer 62 include a material such as silicon oxide ($SiO_2$), titanium oxide ($TiO_2$), lithium fluoride (LiF), calcium fluoride ($CaF_2$), magnesium fluoride ($MgF_2$), silicon nitride (SiNx), tantalum oxide ($Ta_2O_5$), niobium oxide ($Nb_2O_5$), silicon carbonitride (SiCN), molybdenum oxide (MoOx), iron oxide (FeOx), chromium oxide (CrOx), or strontium oxide ($SnO_2$).

The first metal layer 63 is formed below the first dielectric layer 62. The first metal layer 63 absorbs a portion of the incident light and reflects a portion of the incident light. To absorb some of ambient light incident upon the destructive interference unit DI' and thus to reduce the reflection of the ambient light, the first metal layer 63 is formed of a metal material with high light absorptivity. In some embodiments, the first metal layer 63 includes a material such as chromium (Cr), molybdenum (Mo), tungsten (W), titanium (Ti), nickel (Ni), cobalt (Co), copper oxide (CuO), titanium nitride (TiNx), nickel sulfide (NiS), or an alloy thereof, which may be used alone or in connection with one another.

The second dielectric layer 64 is formed below the first metal layer 63. The second dielectric layer 64, like the first dielectric layer 62, serves as a phase matching layer or a phase compensation layer.

The second metal layer 65 is formed below the second dielectric layer 64. The second metal layer 65, like the first metal layer 63, is formed of a metal material with high light absorptivity.

The third metal layer 67 is formed below the second metal layer 65. The third dielectric layer 66 is interposed between the third metal layer 67 and the second metal layer 65.

In some embodiments, third metal layer 67 is a light-blocking layer. The third metal layer 67 corresponds to non-light-emitting areas NLA of the display panel 2 and is formed closed to the display panel 10 than the rest of the destructive interference unit DI'. In some embodiments, the third metal layer 67 is formed of a material such as chromium (Cr), molybdenum (Mo), aluminum (Al), silver (Ag), titanium (Ti), carbon black, or copper oxide (CuO). The third metal layer 67 is formed to have a thickness such that ambient light incident upon the destructive interference unit DI' can be substantially prevented from penetrating into light-emitting areas LA of the display panel 10. In a non-limiting example, the third metal layer 67 is formed to have a thickness of 50 nm or greater.

The first or the second metal layer 63 or 65 may be formed to serve as a light-blocking layer. In some embodiments, when the first metal layer 63 is a light-blocking layer, the second and third metal layers 65 and 67 prevent the reflection of ambient light through DI. In other embodiments, when the second metal layer 65 is a light-blocking layer, the first and third metal layers 63 and 67 prevent the reflection of ambient light through DI.

The third dielectric layer 66 is formed between the second metal layer 65 and the third metal layer 67. The description of the first dielectric layer 62 or the second dielectric layer 64 is directly applicable to the third dielectric layer 66, and thus, a detailed description of the third dielectric layer 66 will be omitted. In some embodiments, the destructive interference unit DI' includes the third dielectric layer 66. However, the described technology is not limited to the inclusion of the third dielectric layer 66. That is, the third dielectric layer 66 is optional.

The transparent conductive layer 61 is formed on the destructive interference unit DI'. That is, the transparent conductive layer 61 is formed on the first dielectric layer 62 of the destructive interference unit DI'. The transparent conductive layer 61 includes a plurality of patterns and the patterns are first sensing patterns of the touch panel 60. In a non-limiting example, the transparent conductive layer 61 is formed of a transparent conductive oxide such as IZO, TTO, or zinc oxide (ZnO).

One of the first metal layer 63, the second metal layer 65, and the third metal layer 67 includes a plurality of second sensing pattern of the touch panel 60. That is, one of the first metal layer 63, the second metal layer 65, and the third metal layer 67 of the destructive interference unit DI' not only contributes to the prevention of reflection of ambient light (or the destructive interference of ambient light), but also perform the functions of sensing patterns of the touch panel 60.

Hereinafter, an embodiment will be described wherein the first metal layer 63 includes the second sensing patterns of the touch panel 60.

Figure 14:
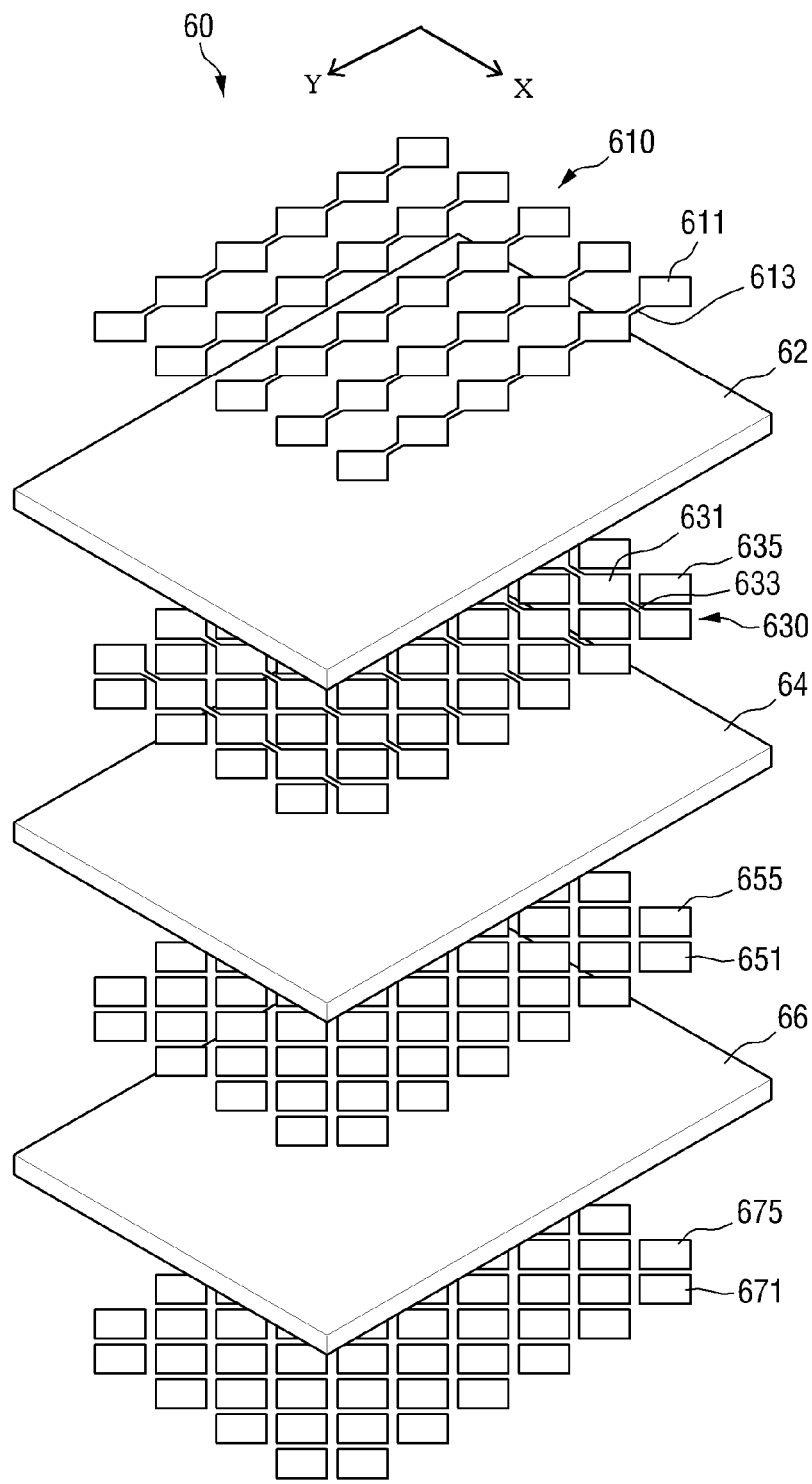
FIG. 14 is an exploded perspective view illustrating an example of the touch panel of the display device illustrated in FIG. 12.
Figure 15:
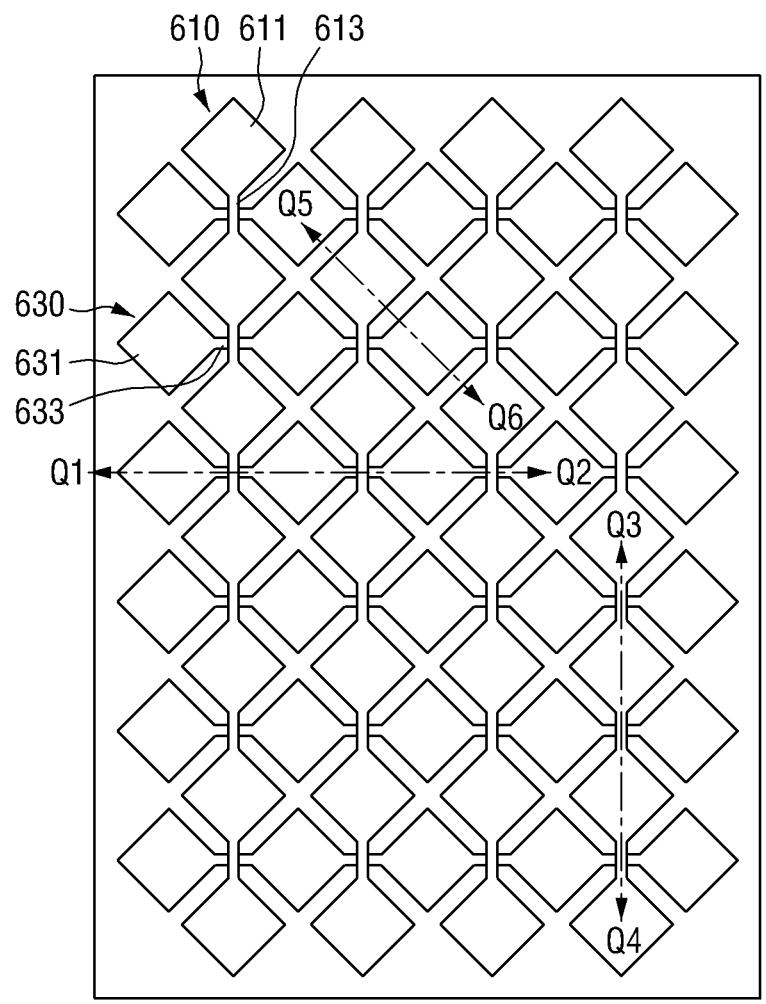
FIG. 15 is a plan view illustrating an example of the touch panel of the display device illustrated in FIG. 12.
Figure 16:
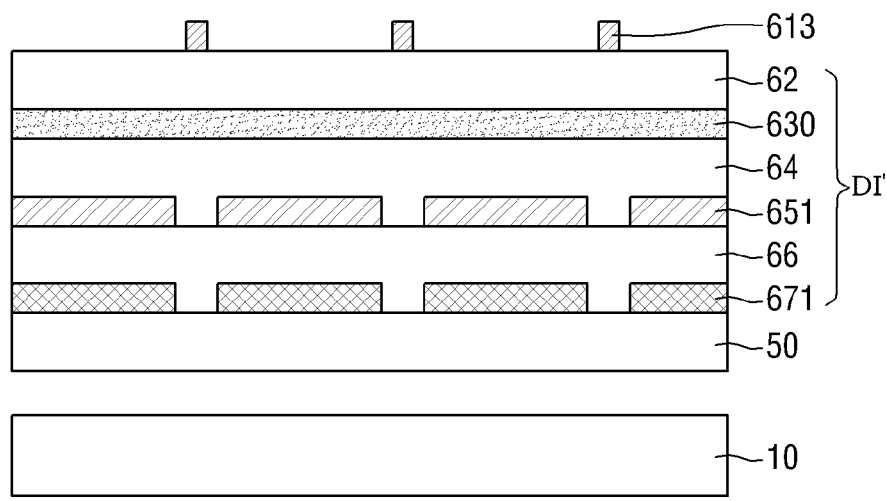
FIGS. 16 to 18 are partial cross-sectional views illustrating examples of the touch panel of the display device illustrated in FIG. 12.
Figure 17:
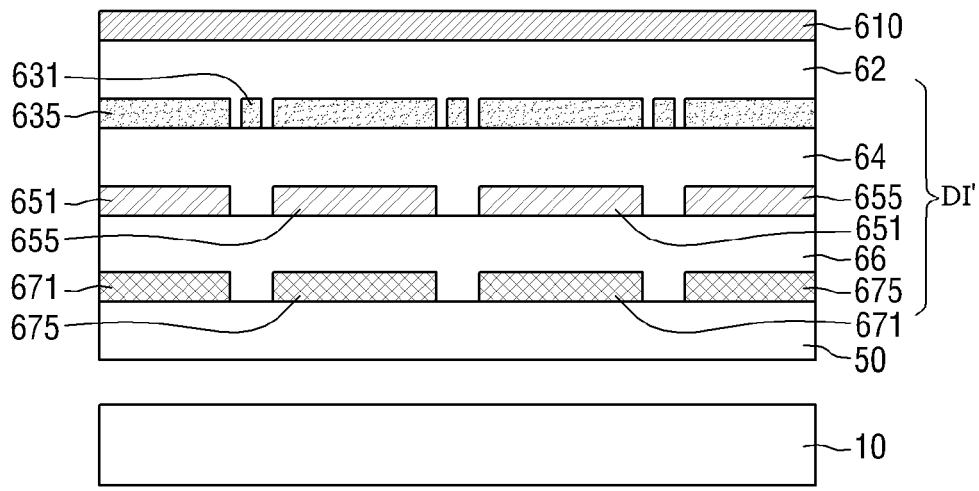
Figure 18:
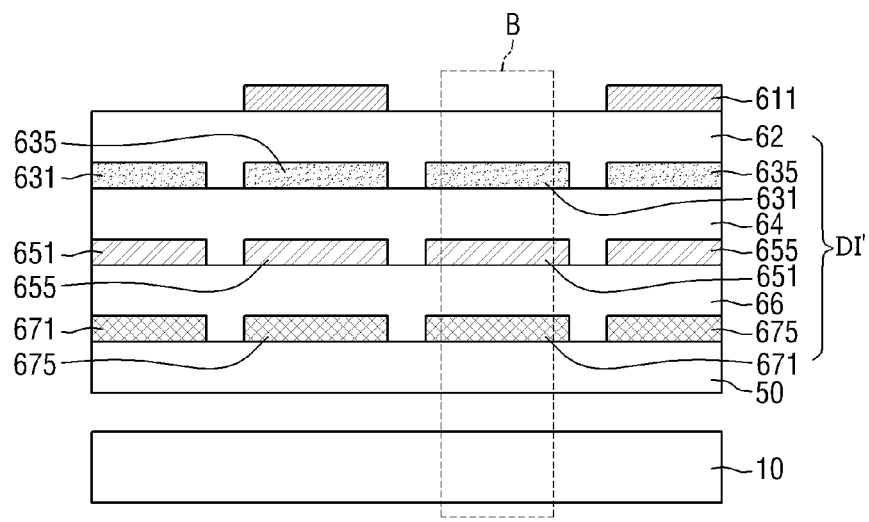

FIG. 14 is an exploded perspective view illustrating an example of the touch panel 60 of the display device 2. FIG. 15 is a plan view illustrating an example of the touch panel 60 of the display device 2. More specifically, FIG. 15 is a plan view of the touch panel illustrated in FIG. 14. FIGS. 16 to 18 are partial cross-sectional views illustrating an example of the touch panel 60 of the display device 2. More specifically, FIG. 16 is a cross-sectional view taken along line Q1-Q2 of FIG. 15, FIG. 17 is a cross-sectional view taken along line Q3-Q4 of FIG. 15, and FIG. 18 is a cross-sectional view taken along line Q5-Q6 of FIG. 15.

Referring to FIGS. 13 to 18, the touch panel 60 includes the transparent conductive layer 61, the first dielectric layer 62, the first metal layer 63, the second dielectric layer 64, the second metal layer 65, the third dielectric layer 66, and the third metal layer 67.

The transparent conductive layer 61, which is formed on the first dielectric layer 62, includes a plurality of first sensing patterns 610. The first sensing patterns 610 extend in a first direction (or a Y-axis direction). The first sensing patterns 610 are spaced apart from each another in a second direction (or an X-axis direction).

The first sensing patterns 610 include a plurality of first sensing cells 611 and a plurality of first connectors 613. In a non-limiting example, the first sensing cells 611 are rhombus- or diamond-shaped. Alternatively, the first sensing cells 611 may have various shapes other than a rhombus- or diamond shape, such as a circular shape, an elliptical shape, or a polygonal shape. A pair of adjacent first sensing cells 611 are spaced apart from each other in the first direction (i.e., the Y-axis direction) or the second direction (i.e., the X-axis direction). The pair of first sensing cells 611 which are adjacent in the first direction (i.e., the Y-axis direction) are electrically connected to each other by a first connector 613. That is, each of the first connectors 613 connects a number of first sensing cells 611 having the same X-axis coordinate. The transparent conductive layer 61 is illustrated as, but is not limited to, including only the first sensing patterns 610. That is, the transparent conductive layer may also include a plurality of floated transparent conductive patterns between the first sensing patterns 610, if necessary.

In some embodiments, the first sensing patterns 610 are formed after the formation of the first dielectric layer 62. In these embodiments, the first sensing patterns 610 are formed directly on the top surface of the first dielectric layer 62 and the first dielectric layer 62 is not be formed in areas where the first sensing patterns 610 are not formed.

The first metal layer 63 is formed below the first dielectric layer 62, i.e., between the first dielectric layer 62 and the second dielectric layer 64. The first metal layer 63 includes a plurality of second sensing patterns 630 and a plurality of first metal patterns 635 formed among the second sensing patterns 630.

The second sensing patterns 630 extend in the second direction (or the X-axis direction). The second sensing patterns 630 are spaced apart from each another in the first direction (or the Y-axis direction).

The second sensing patterns 630 include a plurality of second sensing cells 631 and a plurality of second connectors 633. In a non-limiting example, the second sensing cells 631 are rhombus- or diamond-shaped. Alternatively, the second sensing cells 631 may have various shapes other than a rhombus- or diamond shape, such as a circular shape, an elliptical shape, or a polygonal shape. A pair of adjacent second sensing cells 631 are spaced apart from each other in the first direction (i.e., the Y-axis direction) or the second direction (i.e., the X-axis direction). The pair of second sensing cells 631 which are adjacent in the second direction (i.e., the X-axis direction) are connected to each other by a second connector 633. That is, each of the second connectors 633 connects a number of second sensing cells 631 having the same Y-axis coordinate. The second sensing cells 631 are arranged to not substantially overlap the first sensing cells 611.

The first metal patterns 635 are formed among the second sensing patterns 630. The first metal patterns 635 are physically separate from the second sensing patterns 630. A pair of first metal patterns 635 which are adjacent in the second direction (i.e., the X-axis direction) are spaced apart from each other. That is, the first metal patterns 635 may be floated metal patterns. Thus, the first metal patterns 635 are not electrically connected to a power source.

The second sensing patterns 630 and the first metal patterns 635 are all included in the first metal layer 63, and in some embodiments, are formed of the same material.

In some embodiments, the second sensing patterns 630 and the first metal patterns 635 are formed after the formation of the second dielectric layer 64. In these embodiments, the second sensing patterns 630 and the first metal patterns 635 are formed directly on the top surface of the second dielectric layer 64. The first dielectric layer 62 is formed on the second sensing patterns 630 and the first metal patterns 635 and areas where the second sensing patterns 630 and the first metal patterns 635 are not formed are filled with the first dielectric layer 62. That is, after forming the second sensing patterns 630 and the first metal patterns 635 directly on the top surface of the second dielectric layer 64, the first dielectric layer 62 is formed to cover the second sensing patterns 630, the first metal patterns 635, and the top surface of the second dielectric layer 64.

In response to the top of the touch panel 60 (for example, the top of the window 90 of FIG. 12) being touched by a hand or an object, a resulting variation in capacitance corresponding to the location of the touch panel 60 touched by the hand or the object is transmitted to a driving circuit via first and second sensing patterns 610 and 630, metal wiring (not illustrated), and a location detection line (not illustrated). The location of the touched portion of the touch panel 60 is identified by converting the capacitance variation into an electrical signal.

The second metal layer 65 is formed below the second dielectric layer 64, i.e., between the second dielectric layer 64 and the third dielectric layer 66. The second metal layer 65 includes a plurality of second metal patterns 651 and a plurality of third metal patterns 655.

The second metal patterns 651 overlap the second sensing patterns 630. That is, the second metal patterns 651 are formed between the second dielectric layer 64 and the third dielectric layer 66 in areas corresponding to the second sensing patterns 630. The second metal patterns 651 have the same shape as the second sensing cells 631. In a non-limiting example, the second metal patterns 651 have rhombus- or diamond-shaped. Alternatively, the second metal patterns 651 may have various shapes other than a rhombus- or diamond shape, such as a circular shape, an elliptical shape, or a polygonal shape. The second metal patterns 651 have the same pattern of arrangement as the second sensing cells 631. That is, a pair of second metal patterns 651 which are adjacent in the first direction (i.e., the Y-axis direction) are spaced apart from each other.

Alternatively, the second metal patterns 651 have the same shape as the second sensing patterns 630. The second sensing patterns 651 are illustrated as, but are not limited to, being separate from each another in the first direction (i.e., the Y-axis direction). In some embodiments, second metal patterns 651 include the equivalents of the second connectors 633 of the second sensing patterns 630.

The third metal patterns 655 overlap the first metal patterns 635. That is, the third metal patterns 655 are formed between the second dielectric layer 64 and the third dielectric layer 66 in areas corresponding to the first metal patterns 635. The third metal patterns 655 have the same shape as the first metal patterns 635. In a non-limiting example, the third metal patterns 655 are rhombus- or diamond-shaped. Alternatively, the third metal patterns 655 may have various shapes other than a rhombus- or diamond shape, such as a circular shape, an elliptical shape, or a polygonal shape.

The second and third metal patterns 651 and 655 are all included in the second metal layer 65, and in some embodiments, are formed of the same material. The description of the material of the second metal layer 65 is directly applicable to the second metal patterns 651 and the third metal patterns 655, and thus, a detailed description of the material of the second metal patterns 651 and the third metal patterns 655 will be omitted.

In some embodiments, the second and third metal patterns 651 and 655 are formed after the formation of the third dielectric layer 66. In these embodiments, the second and third metal patterns 651 and 655 are formed directly on the top surface of the third dielectric layer 66. The second dielectric layer 64 is formed on the second and third metal patterns 651 and 655 and areas in which the second metal patterns 651 and the third metal patterns 655 are not formed are filled with the second dielectric layer 64. That is, after forming the second and third metal patterns 651 and 655 directly on the top surface of the third dielectric layer 66, the second dielectric layer 64 is formed to cover the second metal patterns 651, the third metal patterns 655, and the top surface of the third dielectric layer 66.

The third metal layer 67 is formed below the third dielectric layer 66. The third metal layer 67 includes a plurality of fourth metal patterns 671 and a plurality of fifth metal patterns 675.

The fourth metal patterns 671 overlap the second sensing patterns 630. That is, the fourth metal patterns 671 are formed below the third dielectric layer 66 in areas corresponding to the second sensing patterns 630. The fourth metal patterns 671 have the same shape as the second sensing cells 631 or the second sensing patterns 630. The description of the shape of the second metal patterns 651 is directly applicable to the fourth metal patterns 671, and thus, a detailed description of the shape of the fourth metal patterns 671 will be omitted.

The fifth metal patterns 675 overlap the first metal patterns 635. That is, the fifth metal patterns 675 are formed below the third dielectric layer 66 in areas corresponding to the first metal patterns 635. The fifth metal patterns 675 have the same shape as the first metal patterns 635. The description of the shape of the second metal patterns 651 is directly applicable to the third metal patterns 655, and thus, a detailed description of the shape of the fifth metal patterns 675 will be omitted.

In some embodiments, the fourth and fifth metal patterns 671 and 675 are formed before the formation of the third dielectric layer 66. In these embodiments, the fourth and fifth metal patterns 671 and 675 are formed directly on the top surface of the encapsulation member 50. The third dielectric layer 66 is formed on the fourth and fifth metal patterns 671 and 675 and areas in which the fourth and fifth metal patterns 671 and 675 are not formed are filled with the third dielectric layer 66. That is, after forming the fourth and fifth metal patterns 671 and 675 directly on the top surface of the encapsulation member 50, the third dielectric layer 66 is formed to cover the fourth metal patterns 671, the fifth metal patterns 675, and the top surface of the encapsulation member 50.

The second sensing patterns 630, the second metal patterns 651, and the fourth metal patterns 671 all have the same shape and are formed in the same area when viewed from above. Accordingly, the second sensing patterns 630, the second metal patterns 651, and the fourth metal patterns 671 can be formed by using a single mask. Therefore, it is possible to simplify the manufacture of the display device 2 and reduce the manufacturing cost of the display device 2 by reducing the number of masks required to manufacture the display device 2.

Similarly, the first metal patterns 635, the third metal patterns 655, and the fifth metal patterns 675 all have the same shape and are formed in the same area when viewed from above. Accordingly, the first metal patterns 635, the third metal patterns 655, and the fifth metal patterns 675 can be formed by using a single mask. Therefore, it is possible to simplify the manufacture of the display device 2 and reduce the manufacturing cost of the display device 2 by reducing the number of masks required to manufacture the display device 2.

By using a single mask having a first pattern unit corresponding to the second sensing patterns 630, the second metal patterns 651, and the fourth metal patterns 671 and a second pattern unit corresponding to the first metal patterns 635, the third metal patterns 655, and the fifth metal patterns 675, the second sensing patterns 630 and the first metal patterns 635 can be formed together at the same time, the second metal patterns 651 and the third metal patterns 655 can be formed together at the same time, and the fourth metal patterns 671 and the fifth metal patterns 675 can be formed together at the same time.

Figure 19:
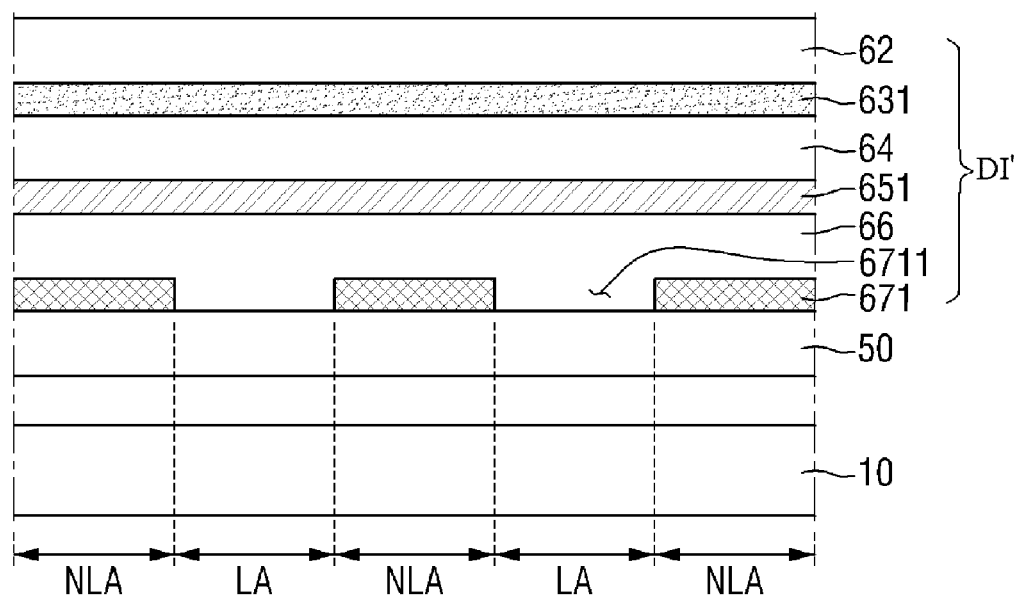
FIG. 19 is an enlarged cross-sectional view illustrating part of the touch panel illustrated in FIG. 18.

FIG. 19 is an enlarged cross-sectional view of part of the touch panel illustrated in FIG. 18. More specifically, FIG. 19 is an enlarged cross-sectional view of portion B of FIG. 18.

Referring to the embodiment of FIGS. 13 to 19, the third metal layer 67 is a light-blocking layer. As already discussed with reference to FIG. 3, the presence of a light-blocking layer prevents the penetration of ambient light incident upon the destructive interference unit DI' into the light-emitting area LA of the display panel 10 and the reflection of the ambient light from the non-light-emitting area NLA of the display panel 10 to the environment.

When the third metal layer 67 is a light-blocking layer, the fourth metal patterns 671 of the third metal layer 67 include a plurality of light-transmitting apertures 6711 which are formed in areas of the third metal layer 67 corresponding to the light-emitting area LA of the display area 10. Light emitted from the light-emitting areas (LA) is emitted from the display panel 10 via the light-transmitting apertures 6711.

Even though not specifically illustrated, the fifth metal patterns 675 also include a plurality of light-transmitting apertures 6711 which are formed in areas of the third metal layer 67 corresponding to the light-emitting area LA of the display area 10.

Figure 20:
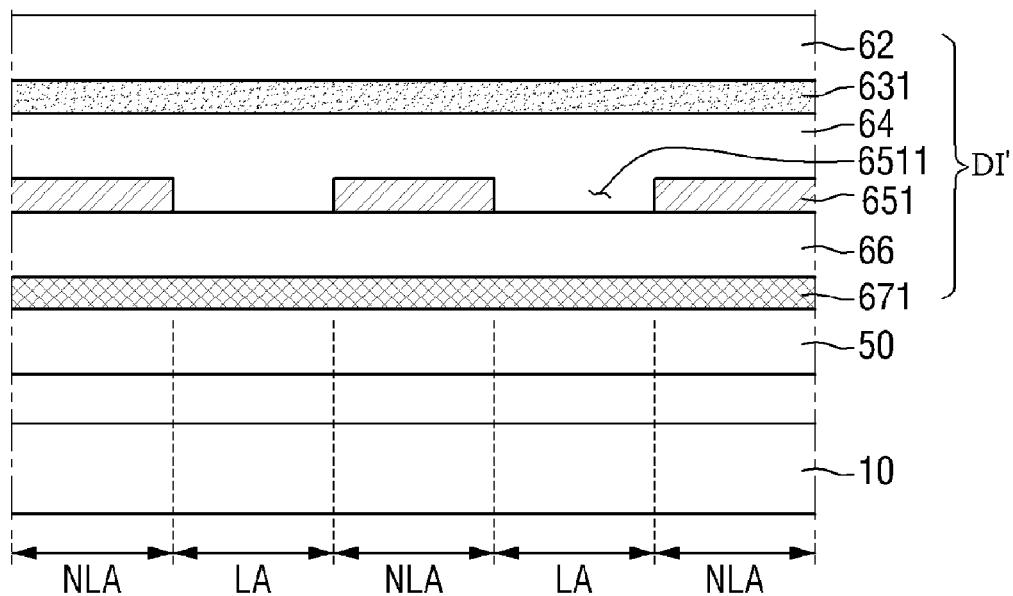
FIGS. 20 and 21 are enlarged cross-sectional views illustrating modified examples of the touch panel illustrated in FIG. 19.
Figure 21:
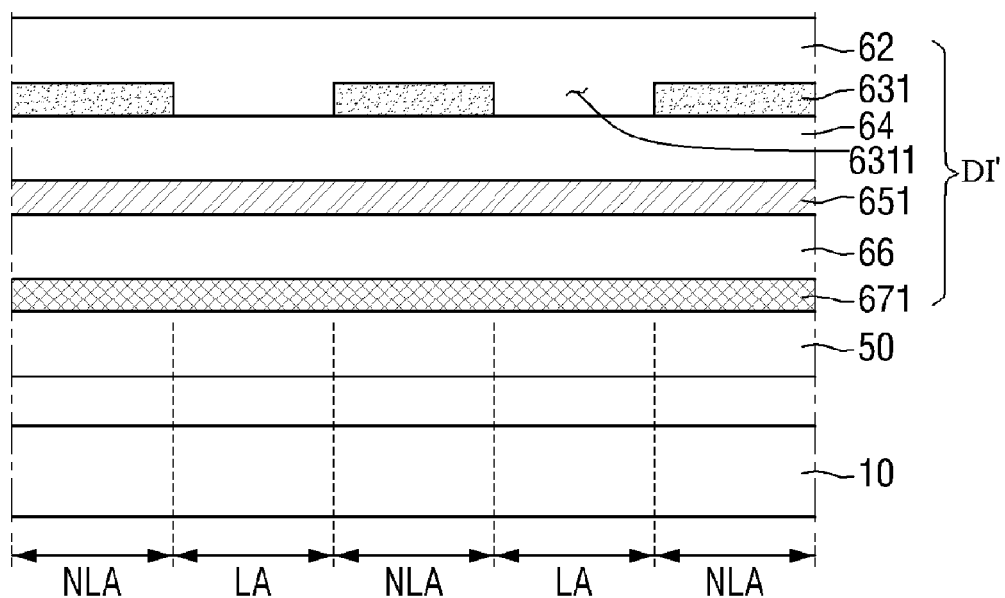

FIGS. 20 and 21 are enlarged cross-sectional views illustrating additional embodiments of the touch panel illustrated in FIG. 19.

Referring to FIGS. the embodiment of 13 to 18 and 20, the second metal layer 65 is a light-blocking layer. When the second metal layer 65 is a light-blocking layer, the second metal patterns 651 of the second metal layer 65 include a plurality of light-transmitting apertures 6511 which are formed in areas of the second metal layer 65 corresponding to the light-emitting area LA of the display area 10. Light emitted from the light-emitting area (LA) is emitted from the display panel 10 via the light-transmitting apertures 6511.

Even though not specifically illustrated, the third metal patterns 655 also include a plurality of light-transmitting apertures 6511 which are formed in areas of the second metal layer 65 corresponding to the light-emitting area LA of the display area 10.

Referring to the embodiment of FIGS. 13 to 18 and 21, the first metal layer 63 is a light-blocking layer. When the first metal layer 63 is a light-blocking layer, the second sensing cells 631 of the first metal layer 63 include a plurality of light-transmitting apertures 6311 which are formed in areas of the first metal layer 63 corresponding to the light-emitting area LA of the display area 10. Light emitted from the light-emitting area (LA) is emitted from display panel 10 via the light-transmitting apertures 6311.

Even though not specifically illustrated, the second connectors 633 or the first metal patterns 635 also include a plurality of light-transmitting apertures 6311 which are formed in areas of the first metal layer 63 corresponding to the light-emitting area LA of the display area 10.

While the described technology has been particularly shown and described with reference to exemplary embodiments thereof, it will be understood by those of ordinary skill in the art that various changes in form and detail may be made therein without departing from the spirit and scope of the described technology as defined by the following claims. The exemplary embodiments should be considered in a descriptive sense only and not for purposes of limitation.

What is claimed is:

1. A touch panel for a display device, comprising:
a destructive interference (DI) unit comprising a plurality of dielectric layers and a plurality of metal layers that are alternately stacked; and
a transparent conductive layer disposed on the DI unit,
wherein the transparent conductive layer comprises a plurality of first sensing patterns, and
wherein a selected one of the metal layers of the DI unit comprises a plurality of second sensing patterns and a plurality of non-sensing metal patterns adjacent to and alternately arranged with the second sensing patterns.

2. The touch panel of claim 1, wherein the first sensing patterns extend in a first direction and the second sensing patterns extend in a second direction crossing the first direction.

3. The touch panel of claim 1, wherein the DI unit further comprises:
a first dielectric layer disposed below the transparent conductive layer;
the selected metal layer disposed below the first dielectric layer;
a second dielectric layer disposed below the selected metal layer; and
a second metal layer disposed below the second dielectric layer,
wherein the non-sensing metal patterns and the second sensing patterns are spaced apart from each other.

4. The touch panel of claim 3, wherein the second metal layer comprises i) a plurality of second metal patterns which substantially overlap with the second sensing patterns and are spaced apart from each other and ii) a plurality of third metal patterns which substantially overlap with the non-sensing metal patterns and are spaced apart from each other.

5. The touch panel of claim 4, wherein the planar shape of the second metal patterns is substantially the same as that of the second sensing patterns.

6. A touch panel for a display device, comprising:
a destructive interference (DI) unit comprising a plurality of dielectric layers and a plurality of metal layers that are alternately stacked; and
a transparent conductive layer disposed on the DI unit,
wherein the transparent conductive layer comprises a plurality of first sensing patterns,
wherein a selected one of the metal layers comprises a plurality of second sensing patterns and a plurality of non-sensing metal patterns adjacent to and alternately arranged with the second sensing patterns,
wherein the DI unit further comprises:
a first dielectric layer disposed below the transparent conductive layer;
the selected metal layer disposed below the first dielectric layer;
a second dielectric layer disposed below the selected metal layer; and
a second metal layer disposed below the second dielectric layer, wherein the non-sensing metal patterns and the second sensing patterns are spaced apart from each other, wherein the DI unit further comprises a third metal layer disposed below the second metal layer, and wherein the third metal layer comprises i) a plurality of fourth metal patterns which substantially overlap with the second sensing patterns and are spaced apart from each other and ii) a plurality of fifth metal patterns which substantially overlap with the non-sensing metal patterns and are spaced apart from each other.

7. The touch panel of claim 6, wherein the DI unit further comprises a third dielectric layer interposed between the second and third metal layers.

8. The touch panel of claim 1, wherein one of the metal layers is a light-blocking layer and wherein the light-blocking layer comprises a plurality of light-transmitting apertures.

9. The touch panel of claim 8, wherein the light-blocking layer is formed of at least one of chromium (Cr), molybdenum (Mo), aluminum (Al), silver (Ag), titanium (Ti), carbon black, or copper oxide (CuO) and wherein the light-blocking layer has a thickness of about 50 nm or greater.

10. The touch panel of claim 1, wherein each of the dielectric layers is formed of at least one of silicon oxide ($SiO_2$), titanium oxide ($TiO_2$), lithium fluoride (LiF), calcium fluoride (CaF2), magnesium fluoride (MgF2), silicon nitride (SiNx), tantalum oxide (Ta2O5), niobium oxide (Nb2O5), silicon carbonitride (SiCN), molybdenum oxide (MoOx), iron oxide (FeOx), chromium oxide (CrOx), or strontium oxide (SnO2).

11. The touch panel of claim 1, wherein each of the metal layers is formed of at least one of chromium (Cr), molybdenum (Mo), tungsten (W), titanium (Ti), nickel (Ni), cobalt (Co), copper oxide (CuO), titanium nitride (TiNx), or nickel sulfide (NiS).

12. A display device, comprising:
a display panel comprising a plurality of light-emitting areas and a plurality of non-light-emitting areas; and
a touch panel formed over the display panel,
wherein the touch panel comprises i) a destructive interference (DI) unit comprising a plurality of dielectric layers and a plurality of metal layers that are alternately stacked and ii) a transparent conductive layer disposed on the DI unit,
wherein the transparent conductive layer comprises a plurality of first sensing patterns, and
wherein a selected one of the metal layers of the DI unit comprises a plurality of second sensing patterns and a plurality of non-sensing metal patterns adjacent to and alternately arranged with the second sensing patterns.

13. The display device of claim 12, wherein one of the metal layers is a light-blocking layer and wherein the light-blocking layer comprises a plurality of light-transmitting apertures which are formed in areas of the light-blocking layer corresponding to the light-emitting areas.

14. The display device of claim 12, wherein the first sensing patterns extend in a first direction and wherein the second sensing patterns extend in a second direction crossing the first direction.

15. The display device of claim 12, wherein the DI unit further comprises:
a first dielectric layer disposed below the transparent conductive layer;
the selected metal layer disposed below the first dielectric layer;
a second dielectric layer disposed below the selected metal layer; and
a second metal layer disposed below the second dielectric layer,
wherein the non-sensing metal patterns and the second sensing patterns are spaced apart from each other.

16. The display device of claim 15, wherein the second metal layer comprises i) a plurality of second metal patterns which substantially overlap with the second sensing patterns and are spaced apart from each other and ii) a plurality of third metal patterns which substantially overlap with the non-sensing metal patterns and spaced apart from each other.

17. A display device comprising:
a display panel comprising a plurality of light-emitting areas and a plurality of non-light-emitting areas; and
a touch panel formed over the display panel,
wherein the touch panel comprises i) a destructive interference (DI) unit comprising a plurality of dielectric layers and a plurality of metal layers that are alternately stacked and ii) a transparent conductive layer disposed on the DI unit,
wherein the transparent conductive layer comprises a plurality of first sensing patterns,
wherein a selected one of the metal layers of the DI unit comprises a plurality of second sensing patterns and a plurality of non-sensing metal patterns adjacent to and alternately arranged with the second sensing patterns,
wherein the DI unit further comprises:
a first dielectric layer disposed below the transparent conductive layer,
the selected metal layer disposed below the first dielectric layer,
a second dielectric layer disposed below the selected metal layer, and
a second metal layer disposed below the second dielectric layer,
wherein the non-sensing metal patterns and the second sensing patterns are spaced apart from each other,
wherein the DI unit further comprises a third metal layer disposed below the second metal layer, and
wherein the third metal layer comprises i) a plurality of fourth metal patterns which substantially overlap with the second sensing patterns and are spaced apart from each other and ii) a plurality of fifth metal patterns which substantially overlap with the non-sensing metal patterns and are spaced apart from each other.

18. The display device of claim 17, wherein the DI unit further comprises a third dielectric layer interposed between the second and third metal layers.

19. The display device of claim 12, further comprising an encapsulation member interposed between the touch panel and the display panel, wherein the DI unit is interposed between the transparent conductive layer and the encapsulation member.

20. The display device of claim 12, further comprising an encapsulation member formed over the touch panel wherein the DI unit is interposed between the transparent conductive layer and the display panel.

* * * * *